US012638809B2

(12) United States Patent
    Kurita et al.

(10) Patent No.: US 12,638,809 B2
(45) Date of Patent: May 26, 2026

(54) LASER PROCESSING DEVICE AND LASER PROCESSING METHOD

(71) Applicant: HAMAMATSU PHOTONICS K.K., Hamamatsu (JP)

(72) Inventors: Takashi Kurita, Hamamatsu (JP); Yuu Takiguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 877 days.

(21) Appl. No.: 17/917,069

(22) PCT Filed: Feb. 17, 2021

(86) PCT No.: PCT/JP2021/005956
    § 371 (c)(1),
    (2) Date: Oct. 5, 2022

(87) PCT Pub. No.: WO2021/205756
    PCT Pub. Date: Oct. 14, 2021

(65) Prior Publication Data
    US 2023/0185238 A1     Jun. 15, 2023

(30) Foreign Application Priority Data
    Apr. 8, 2020   (JP) ................................. 2020-070002

(51) Int. Cl.
    *G03H 1/22*         (2006.01)
(52) U.S. Cl.
    CPC ....... *G03H 1/2294* (2013.01); *G03H 2225/32* (2013.01)
(58) Field of Classification Search
    CPC ................................................. G03H 1/2294
    See application file for complete search history.

(56) References Cited

U.S. PATENT DOCUMENTS

| | | | | |
|---|---|---|---|---|
| 9,889,523 B2 | 2/2018 | Gauch | | |
| 2011/0188251 A1* | 8/2011 | Kalms | ................. | A61B 5/0095 |
| | | | | 82/1.11 |

(Continued)

FOREIGN PATENT DOCUMENTS

| | | |
|---|---|---|
| CN | 101861228 A | 10/2010 |
| CN | 106233107 A | 12/2016 |

(Continued)

OTHER PUBLICATIONS

JP 2006119427A translation, 2006.*

(Continued)

*Primary Examiner* — Woody A Lee, Jr.
(74) *Attorney, Agent, or Firm* — Faegre Drinker Biddle & Reath LLP

(57)         ABSTRACT

A laser processing apparatus includes a spatial light modulator for inputting laser light output from a laser light source and outputting laser light after phase modulation by a hologram, and a control unit for presenting, on the spatial light modulator, the hologram for focusing the laser light after the phase modulation output from the spatial light modulator on a plurality of irradiation points in a processing object by a focusing optical system. The control unit sets at least one of a shape and a size of a processing region defined by the irradiation points in a first plane intersecting an optical axis of the laser light and a processing region defined by the irradiation points in a second plane intersecting the optical axis and separated from the first plane in a direction of the optical axis to be different from each other.

18 Claims, 27 Drawing Sheets

(56) References Cited

U.S. PATENT DOCUMENTS

| | | | | | |
|---|---|---|---|---|---|
| 2019/0084089 | A1* | 3/2019 | Igasaki | .............. | B23K 26/0884 |
| 2020/0061740 | A1 | 2/2020 | Okuma | | |

FOREIGN PATENT DOCUMENTS

| | | | | |
|---|---|---|---|---|
| CN | 104302438 | B | | 3/2017 |
| CN | 110510887 | A | | 11/2019 |
| CN | 110877161 | A | | 3/2020 |
| CN | 115297988 | A | | 11/2022 |
| GB | 2574058 | A | | 11/2019 |
| JP | 2006119427 | A | * | 5/2006 |
| JP | 2009-056507 | A | | 3/2009 |
| JP | 5355576 | B2 | | 11/2013 |
| JP | 2015-521108 | A | | 7/2015 |
| JP | 2017-064746 | A | | 4/2017 |
| JP | 2020-006393 | A | | 1/2020 |
| WO | WO-2010/024218 | A1 | | 3/2010 |
| WO | WO-2013/164125 | A1 | | 11/2013 |
| WO | 2016/084138 | A1 | | 6/2016 |

OTHER PUBLICATIONS

International Preliminary Report on Patentability mailed Oct. 20, 2022 for PCT/JP2021/005956.

F. Mezzapesa et al., "High-resolution monitoring of the hole depth during ultrafast laser ablation drilling by diode laser self-mixing interferometry," Opt. Lett. vol. 36, 2011, pp. 822-824.

Chen Jiabi et al, "Principles and Applications of Optical Information Technology, First Edition", Higher Education Press, Jul. 31, 2002, p. 162-p. 163.

* cited by examiner (a)

(b)

(a)

(b)

(c)

(d)

(e)

(a)

(b)

(a)

(b)

(a)

(b)

(c)

(d)

(a)

(b)

(a)

(b)

(c)

(a)

(b)

(c)

(a)

(b)

(a)

(b)

(a)

(b)

(a)

(b)

(a)

(b)

(a)

(b)

(c)

(a)

(b)

(c)

(d)

(a)

(b)

(c)

(d)

(a)

(b)

(c)

(d)

(a)

(b)

(c)

(d)

(a)

(e)

(c)

(d)

(b)

LASER PROCESSING DEVICE AND LASER PROCESSING METHOD

TECHNICAL FIELD

The present disclosure relates to a laser processing apparatus and a laser processing method.

BACKGROUND ART

Patent Document 1 discloses a technique related to a laser processing method by laser ablation. In this laser processing method, a beam shaping device capable of varying a beam profile is used, and a plurality of processing surfaces arranged in a thickness direction of a processing object are irradiated with laser beams having beam profiles of geometric shapes different from each other.

Patent Document 2 discloses a technique related to a laser processing apparatus and a laser processing method. In this laser processing method, laser light output from a laser light source is phase-modulated by a spatial phase modulation element and guided to an imaging optical system, and a processing object is irradiated with the laser light by the imaging optical system to process the processing object. As input data to be input to the spatial phase modulation element, composite data including image reconstruction hologram data for reconstructing a processing shape of the processing object and position movement hologram data for performing image reconstruction at a predetermined processing position is used. Further, laser processing is performed on the processing object while sequentially changing the composite data.

CITATION LIST

Patent Literature

Patent Document 1: Japanese Patent Application Laid-Open Publication No. 2015-521108
Patent Document 2: Japanese Patent Application Laid-Open Publication No. 2006-119427

Non Patent Literature

Non Patent Document 1: F. Mezzapesa et al., "High-resolution monitoring of the hole depth during ultrafast laser ablation drilling by diode laser self-mixing inter-ferometry", Opt. Lett. Vol. 36, pp. 822-824 (2011)

SUMMARY OF INVENTION

Technical Problem

A processing object can be processed by focusing laser light output from a laser light source by a focusing optical system and irradiating the processing object with the laser light. When a lens is simply used to focus the laser light, the processing object can be processed into a desired shape by scanning a focusing position of the laser light. However, in this case, processing takes a long time.

For reducing the processing time, for example, a configuration may be considered in which multipoint simultaneous processing is performed by simultaneously focusing and applying the laser light to a plurality of irradiation points. As a method for the above configuration, there is a method of presenting a hologram on a spatial light modulator of a phase modulation type, phase-modulating laser light output from a single laser light source by the spatial light modulator, and simultaneously focusing and applying the phase-modulated laser light to the plurality of irradiation points by a focusing optical system. In this case, the hologram presented on the spatial light modulator has a phase modulation distribution for focusing the laser light on the plurality of irradiation points by the focusing optical system.

In the method described above, it is desired to freely control a position of the irradiation point and perform more complicated processing.

An object of the present invention is to perform more complicated processing in a laser processing apparatus and a laser processing method in which focused irradiation is simultaneously performed on a plurality of irradiation points by phase-modulating laser light using a spatial light modulator. cl Solution to Problem An embodiment of the present invention is a laser processing apparatus. The laser processing apparatus includes a spatial light modulator for inputting laser light output from a laser light source, presenting a hologram for modulating a phase of the laser light in each of a plurality of pixels arranged two-dimensionally, and outputting laser light after phase modulation by the hologram; a focusing optical system provided at a subsequent stage of the spatial light modulator; and a control unit for presenting, on the spatial light modulator, the hologram for focusing the laser light after the phase modulation output from the spatial light modulator on a plurality of irradiation points in a processing object by the focusing optical system, and the control unit sets at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis to be different from each other.

An embodiment of the present invention is a laser processing method. The laser processing method repeatedly performs a control step of presenting, on a spatial light modulator, a hologram for modulating a phase of light in each of a plurality of pixels arranged two-dimensionally; a light modulation step of inputting laser light output from a laser light source to the spatial light modulator, and performing phase modulation of the laser light by the hologram; and a focusing step of focusing the laser light after the phase modulation, and in the control step, the spatial light modulator presents the hologram for focusing the laser light after the phase modulation on a plurality of irradiation points in a processing object by the focusing step, and at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis is set different from each other.

In the above laser processing apparatus and laser processing method, at least one of the shape and the size of the processing region defined by the plurality of irradiation points in each of the first and second planes separated in the optical axis direction is set different from each other. In this way, by changing the shape and/or the size of the processing region for each of the plurality of planes separated in the optical axis direction, it is possible to perform the processing that is more complicated than in the past, such as freely setting the shape of the cross-section perpendicular to the optical axis direction.

Advantageous Effects of Invention

According to the embodiments of the present invention, it is possible to perform more complicated processing in a laser processing apparatus and a laser processing method for simultaneously performing focused irradiation on a plurality of irradiation points by phase-modulating laser light using a spatial light modulator.

4

Figure 14:
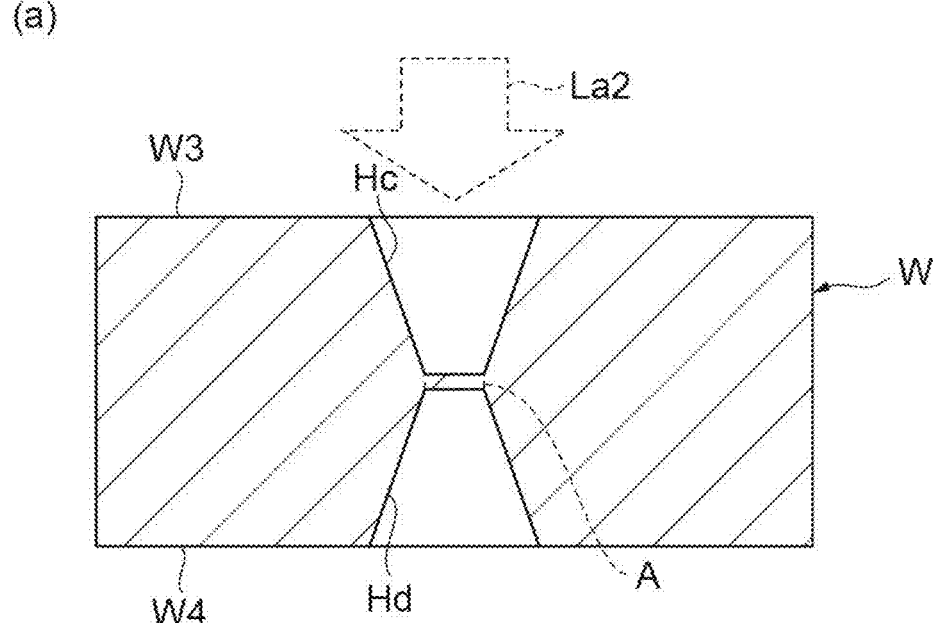
Figure 14:
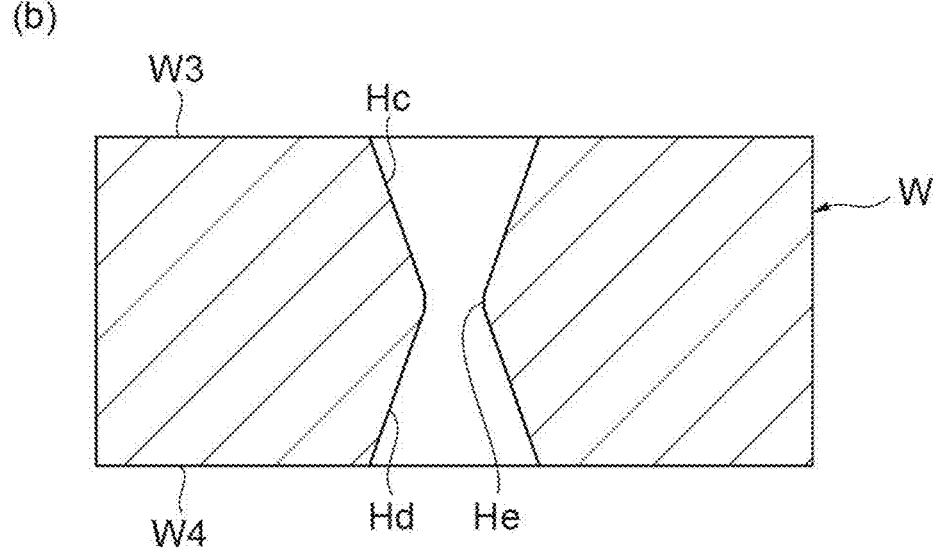

FIG. 14 includes (a) a cross-sectional view illustrating a state in which the processing object W is irradiated with the laser light La2, and (b) a cross-sectional view illustrating holes Hc, Hd, and He formed in the processing object W.

Figure 15:
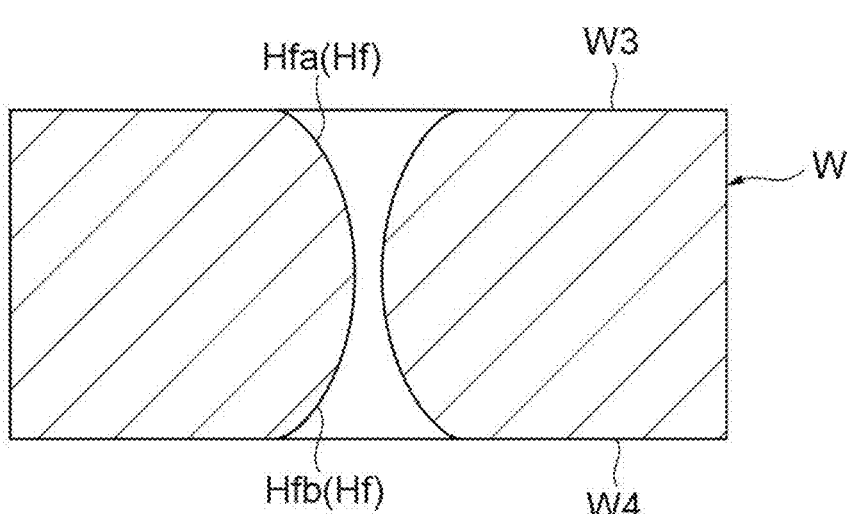
Figure 15:
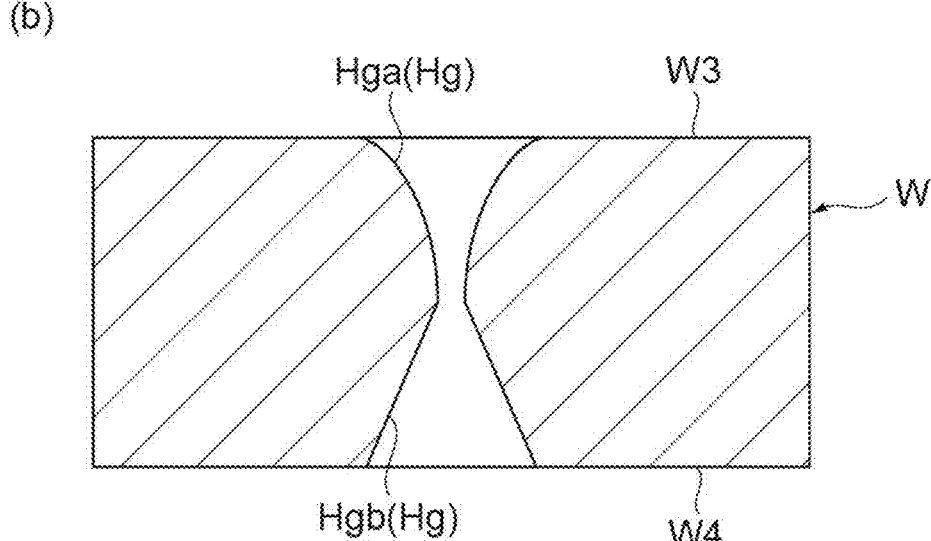

FIG. 15 includes (a) a diagram illustrating a cross-sectional shape of a through hole Hf formed when contours of two processing regions A have curvatures, and (b) a diagram illustrating a cross-sectional shape of a through hole Hg formed when a contour of one processing region A has a curvature.

Figure 16:
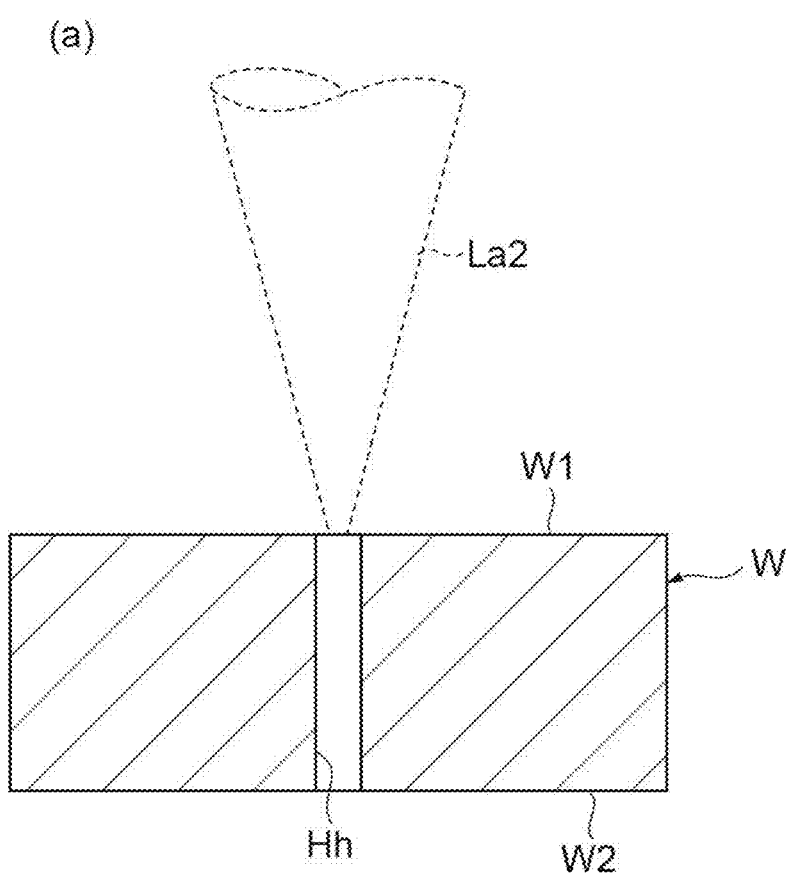
Figure 16:
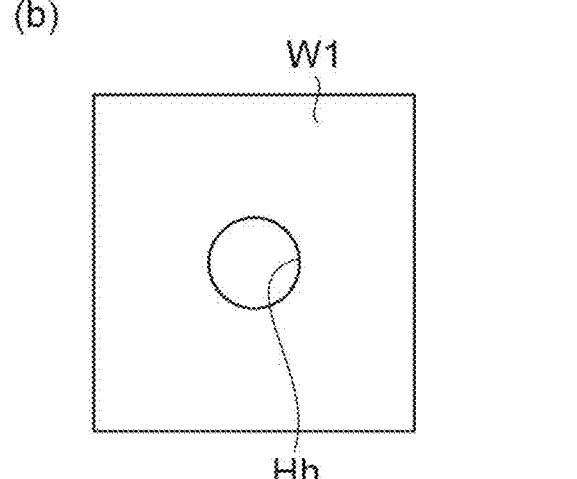
Figure 16:
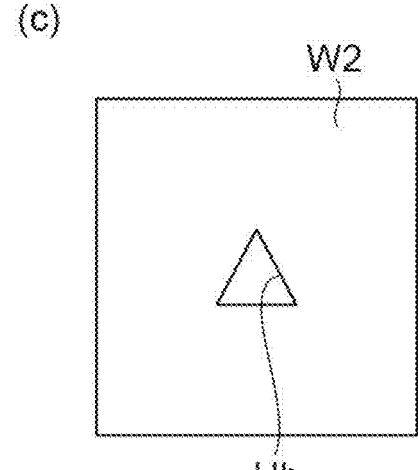

FIG. 16 includes (a) a cross-sectional view illustrating a hole Hh formed by irradiation of the laser light La2, (b) a plan view illustrating a shape of the hole Hh on one surface W1 of the processing object W, and (c) a plan view illustrating a shape of the hole Hh on the other surface W2 of the processing object W.

Figure 17:
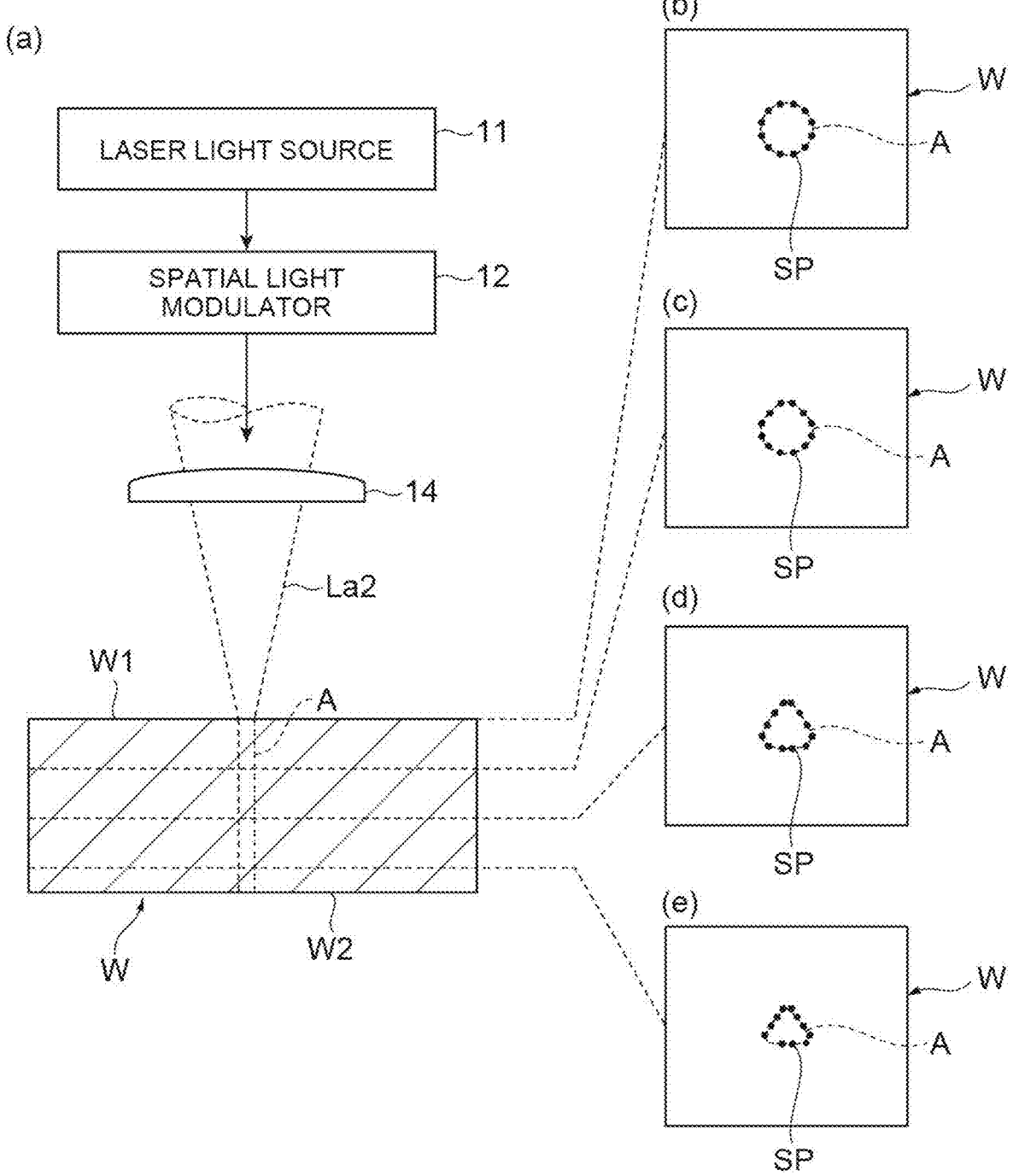

FIG. 17 includes diagrams conceptually illustrating a change of a shape of the processing region A in an optical axis direction of the laser light La2 for forming the hole Hh, and illustrates (a) an outline of a configuration for irradiating the processing object W with the laser light La2 and a cross-section of the processing object W in the optical axis direction of the laser light La2, and illustrates (b)-(e) the shape of the processing region A in each plane located at different depths in the processing object W and a plurality of irradiation points SP in each plane.

Figure 18:
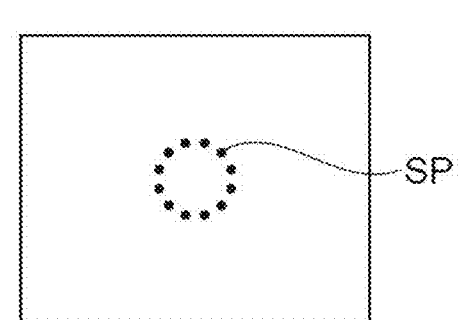
Figure 18:
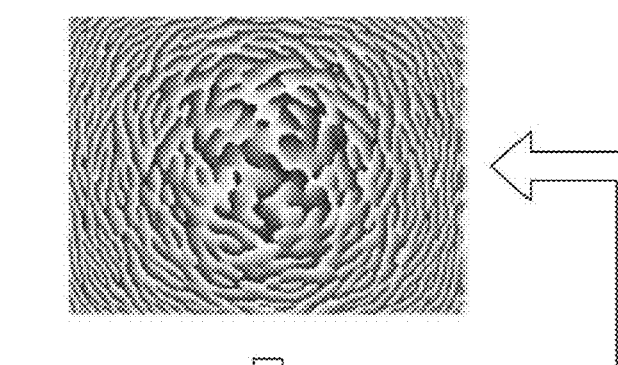
Figure 18:
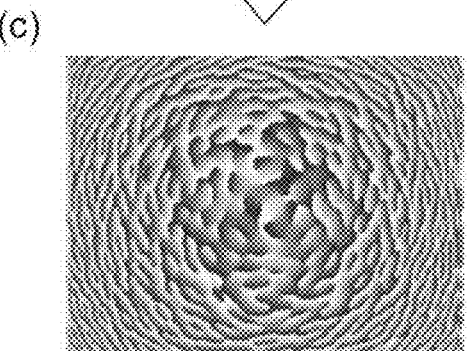
Figure 18:
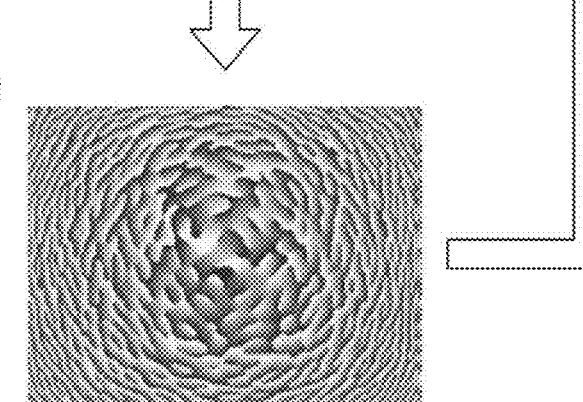

FIG. 18 includes diagrams illustrating an example of a hologram corresponding to the plane illustrated in (b) in FIG. 17, and illustrates (a) the plurality of irradiation points SP illustrated in (b) in FIG. 17, and illustrates (b)-(d) examples of holograms for realizing the plurality of irradiation points SP illustrated in (a).

Figure 19:
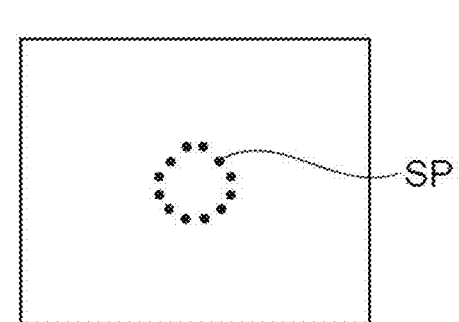
Figure 19:
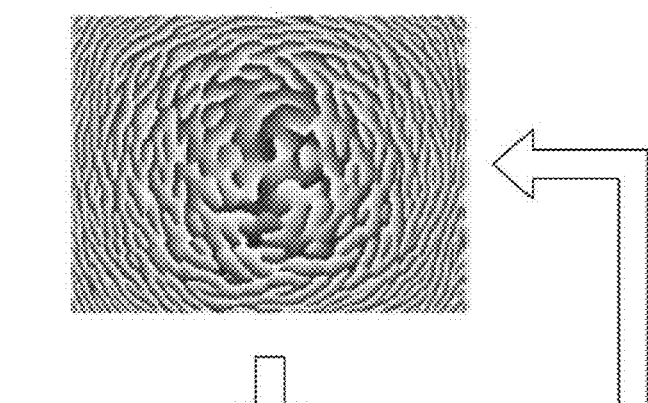
Figure 19:
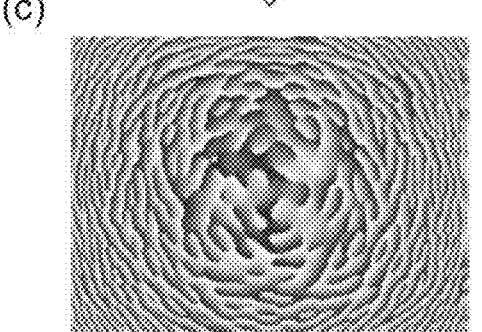
Figure 19:
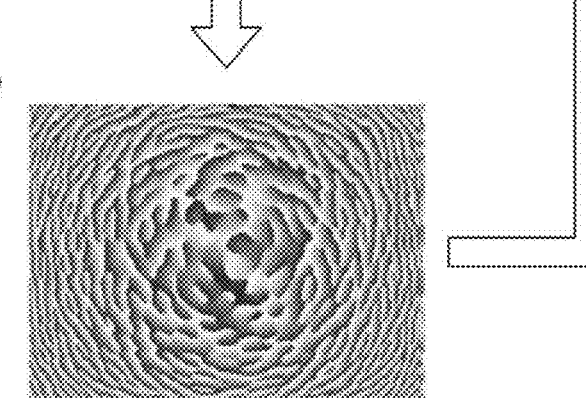

FIG. 19 includes diagrams illustrating an example of a hologram corresponding to the plane illustrated in (c) in FIG. 17, and illustrates (a) the plurality of irradiation points SP illustrated in (c) in FIG. 17, and illustrates (b)-(d) examples of holograms for realizing the plurality of irradiation points SP illustrated in (a).

Figure 20:
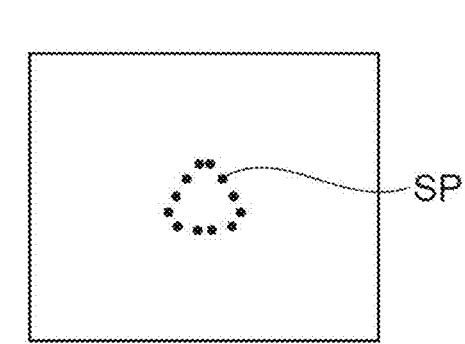
Figure 20:
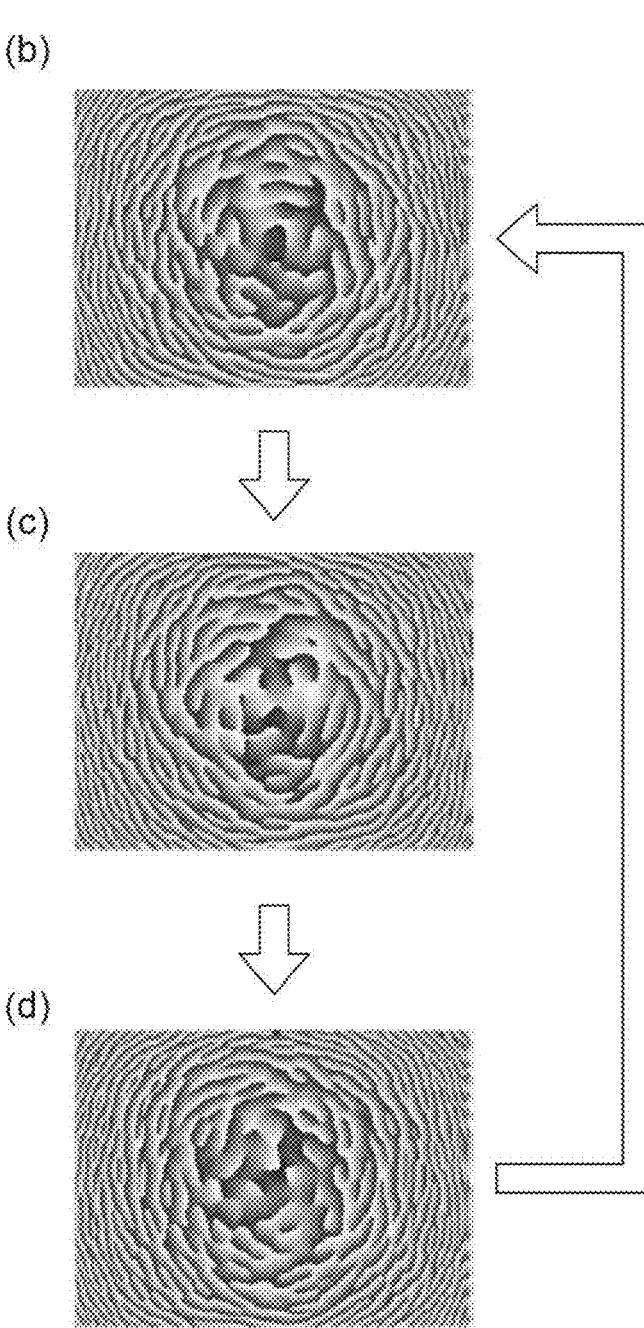

FIG. 20 includes diagrams illustrating an example of a hologram corresponding to the plane illustrated in (d) in FIG. 17, and illustrates (a) the plurality of irradiation points SP illustrated in (d) in FIG. 17, and illustrates (b)-(d) examples of holograms for realizing the plurality of irradiation points SP illustrated in (a).

Figure 21:
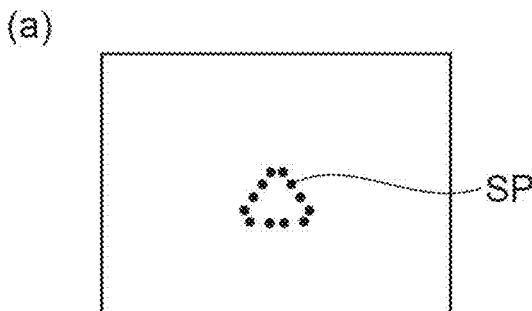
Figure 21:
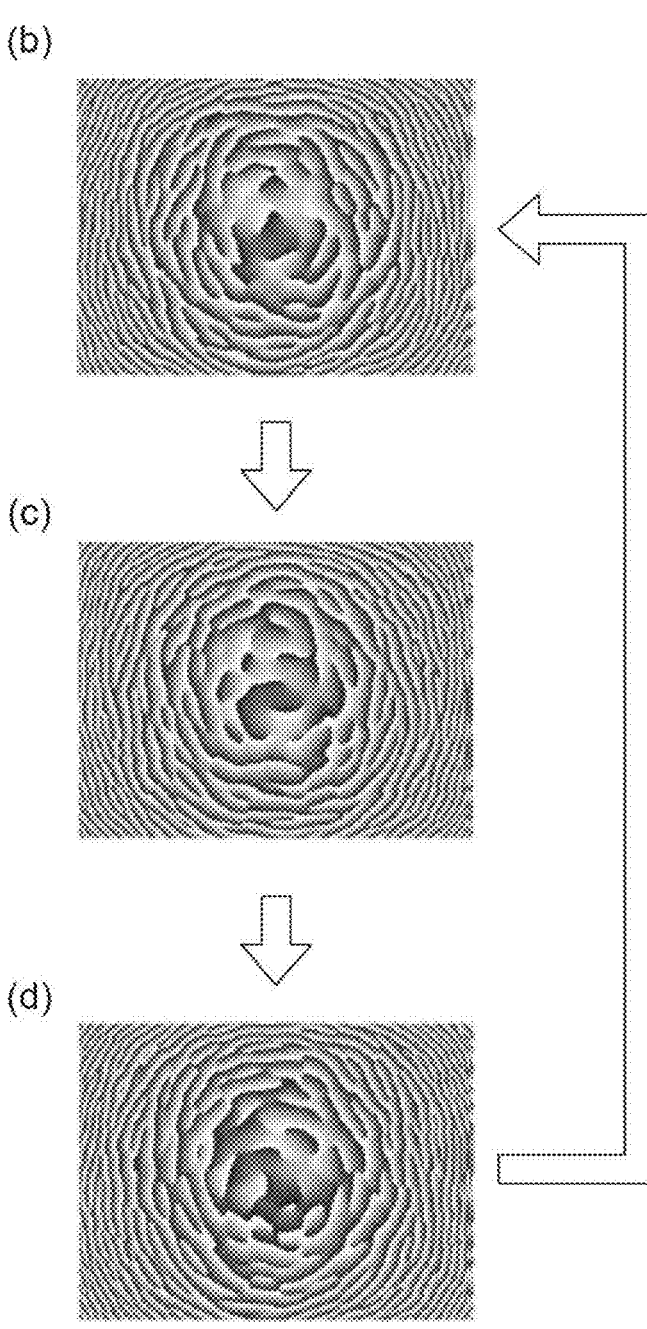

FIG. 21 includes diagrams illustrating an example of a hologram corresponding to the plane illustrated in (e) in FIG. 17, and illustrates (a) the plurality of irradiation points SP illustrated in (e) in FIG. 17, and illustrates (b)-(d) examples of holograms for realizing the plurality of irradiation points SP illustrated in (a).

Figure 22:
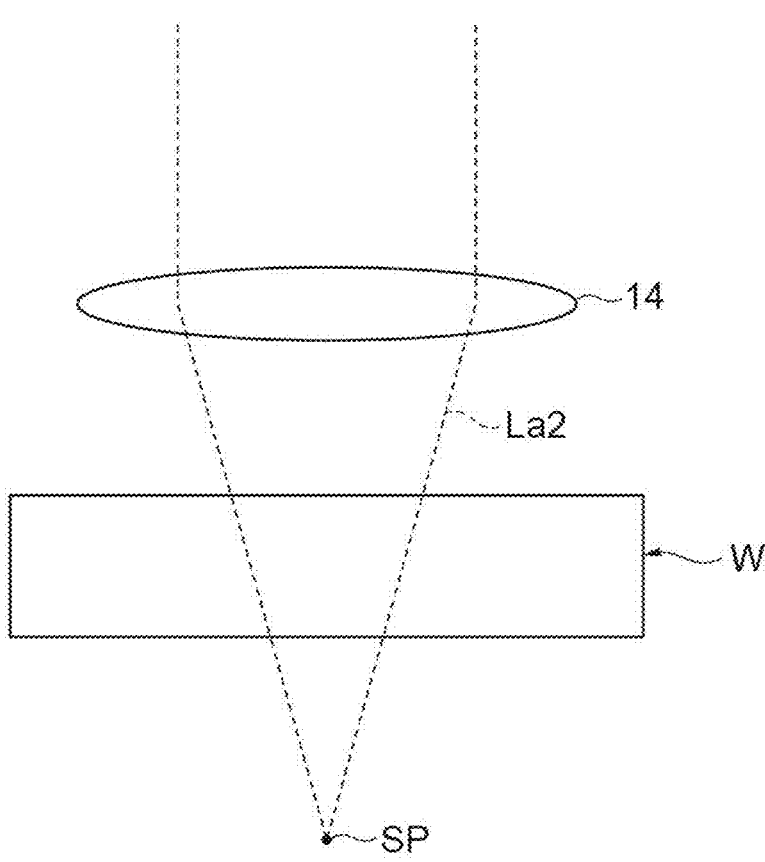

FIG. 22 is a diagram illustrating a state in which the irradiation point SP of the laser light La2 is formed farther than the processing object W.

Figure 23:
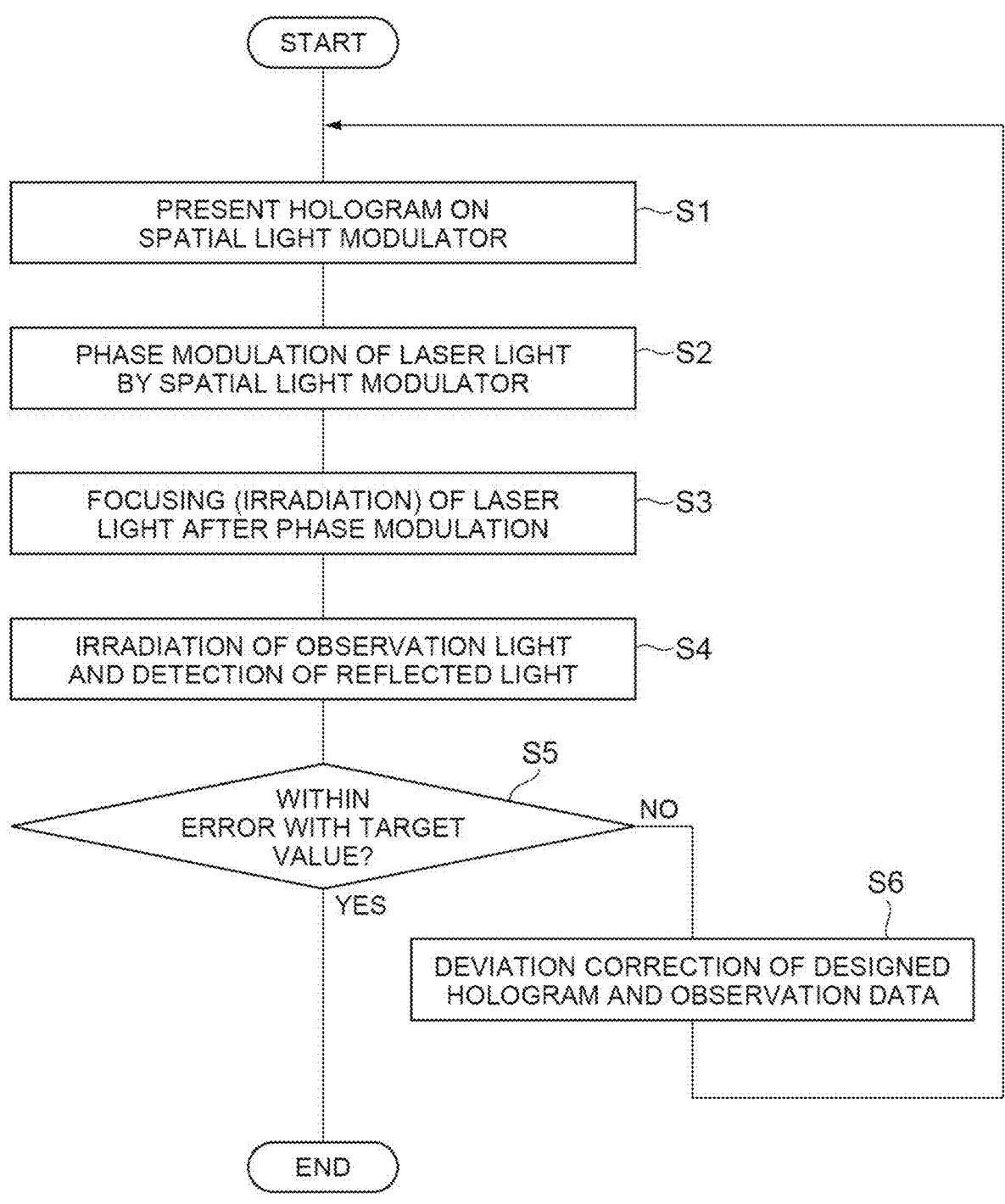

FIG. 23 is a flowchart illustrating a laser processing method according to an embodiment.

Figure 24:
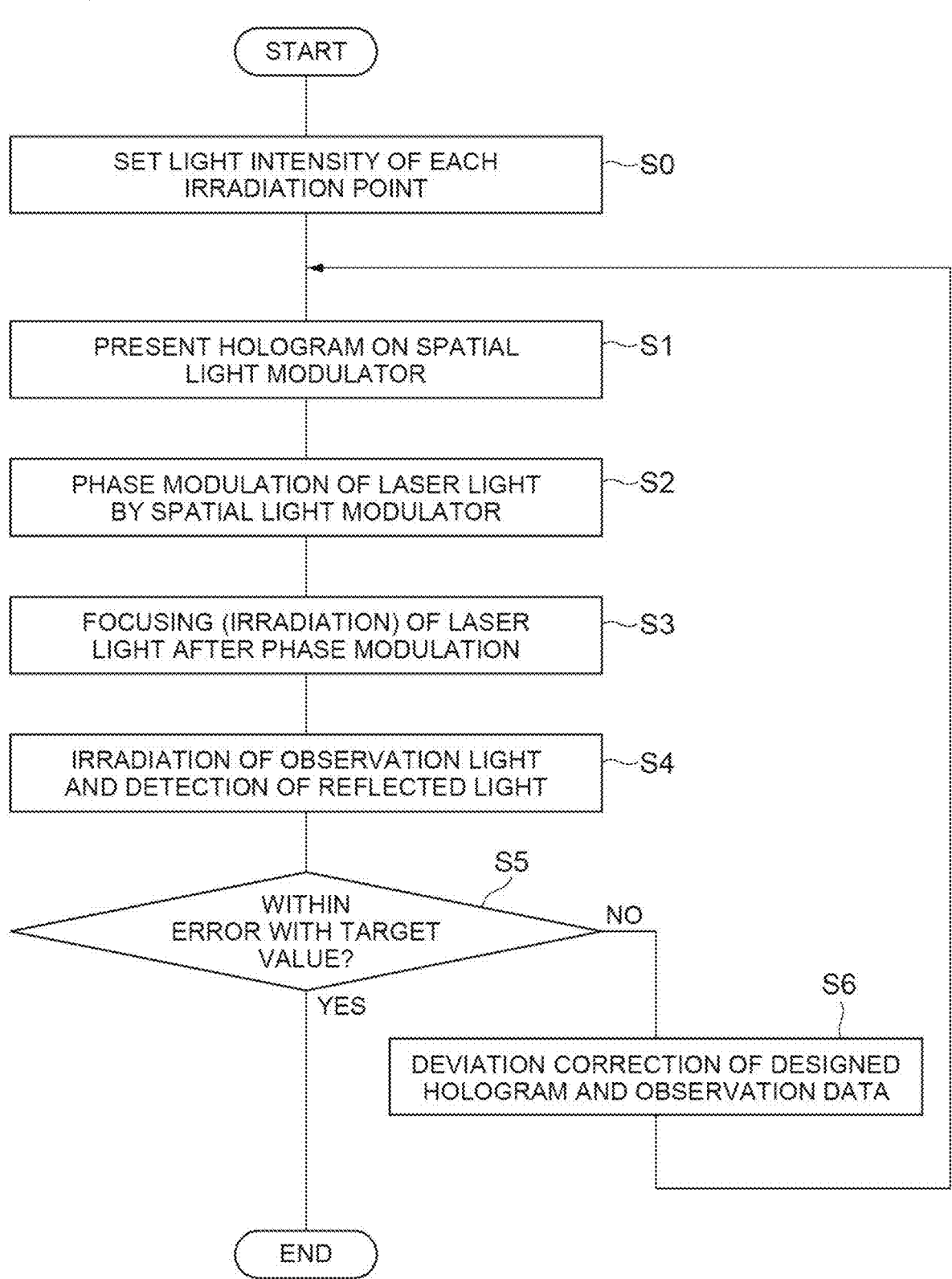

FIG. 24 is a flowchart illustrating a case where a storage step S0 is performed before a control step S1.

Figure 25:
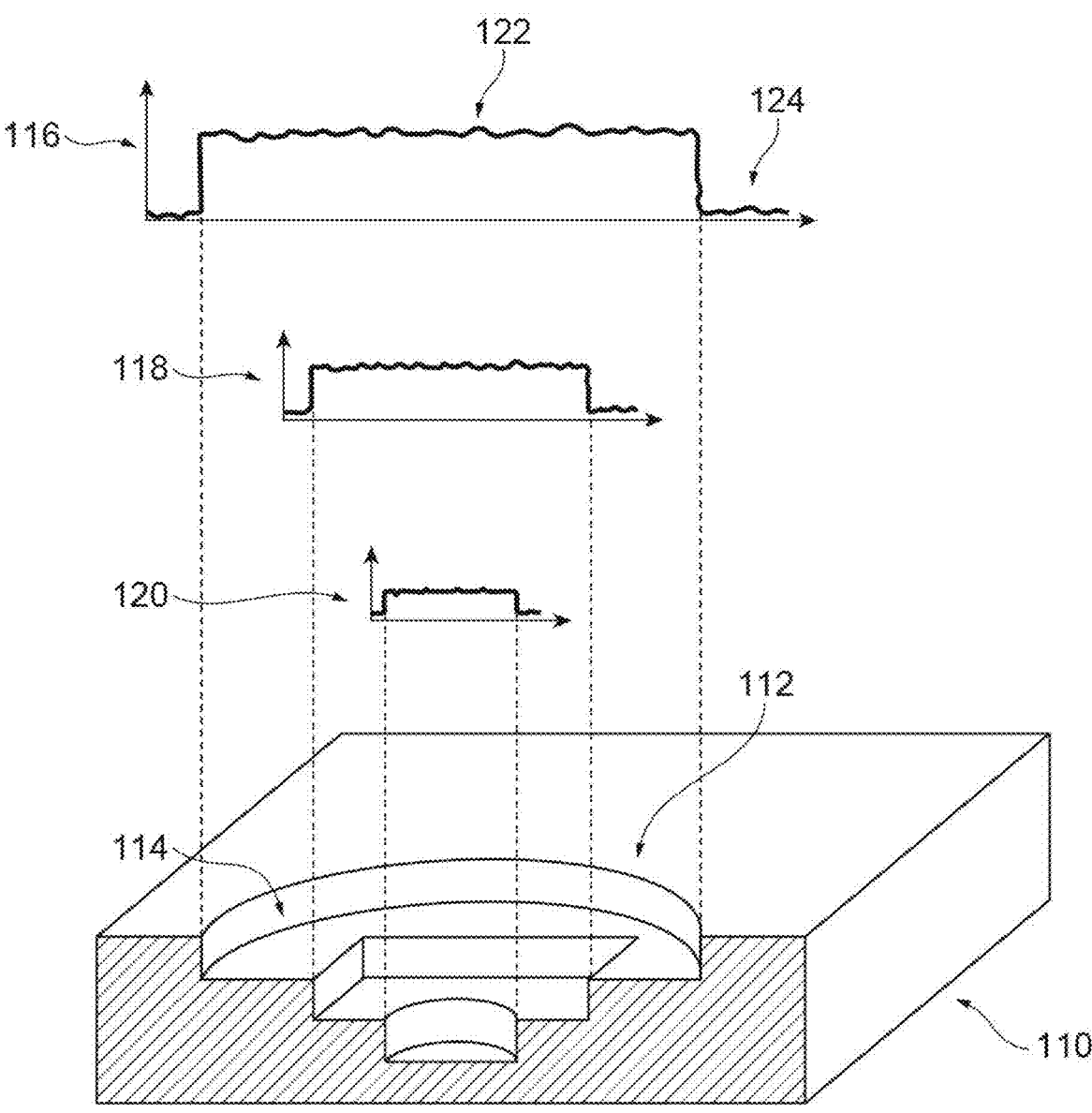

FIG. 25 is a diagram for describing a laser processing method described in Patent Document 1.

Figure 26:
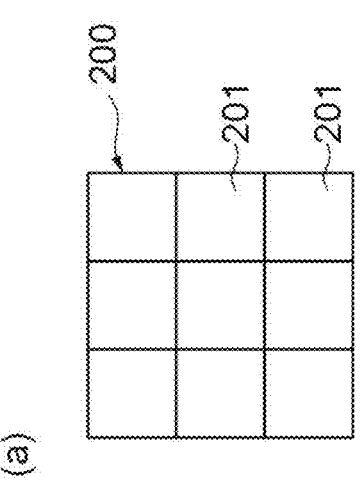
Figure 26:
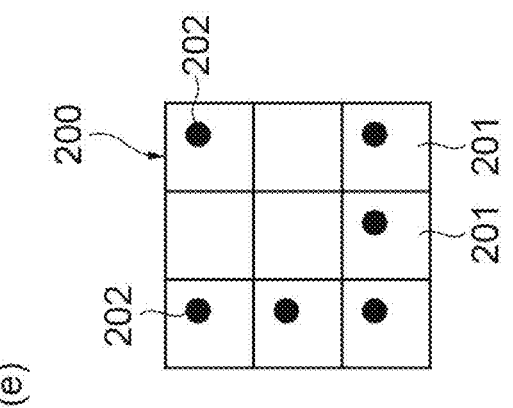
Figure 26:
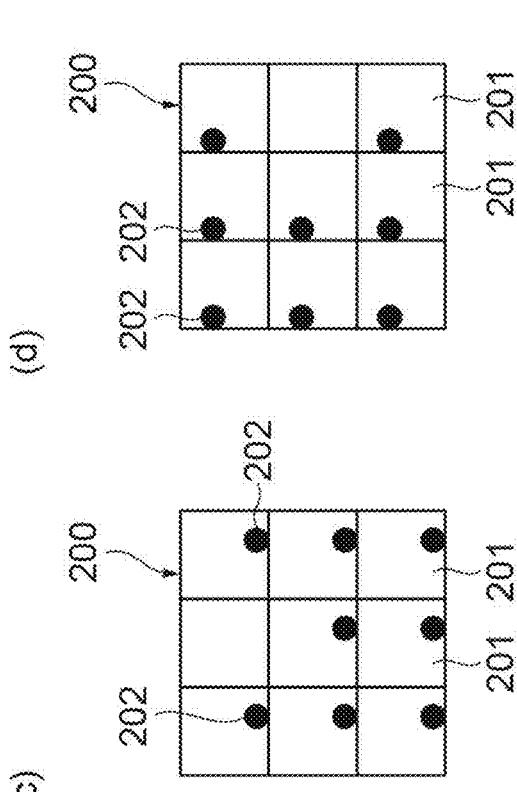
Figure 26:
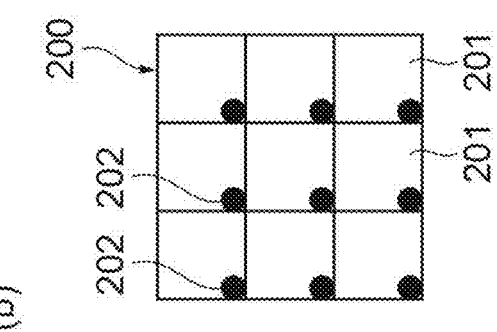

FIG. 26 includes (a)-(e) diagrams for describing a laser processing method described in Patent Document 2.

Figure 27:
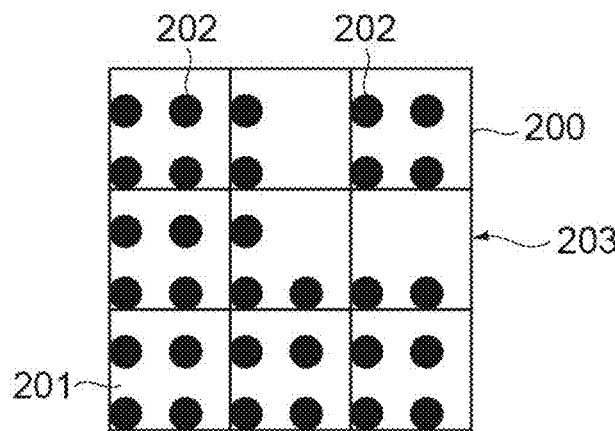

FIG. 27 is a diagram for describing the laser processing method described in Patent Document 2.

DESCRIPTION OF EMBODIMENTS

Hereinafter, embodiments of a laser processing apparatus and a laser processing method will be described in detail with reference to the accompanying drawings. In the description of the drawings, the same elements will be denoted by the same reference signs, and redundant description will be omitted. Further, the present invention is not limited to these examples.

Figure 1:
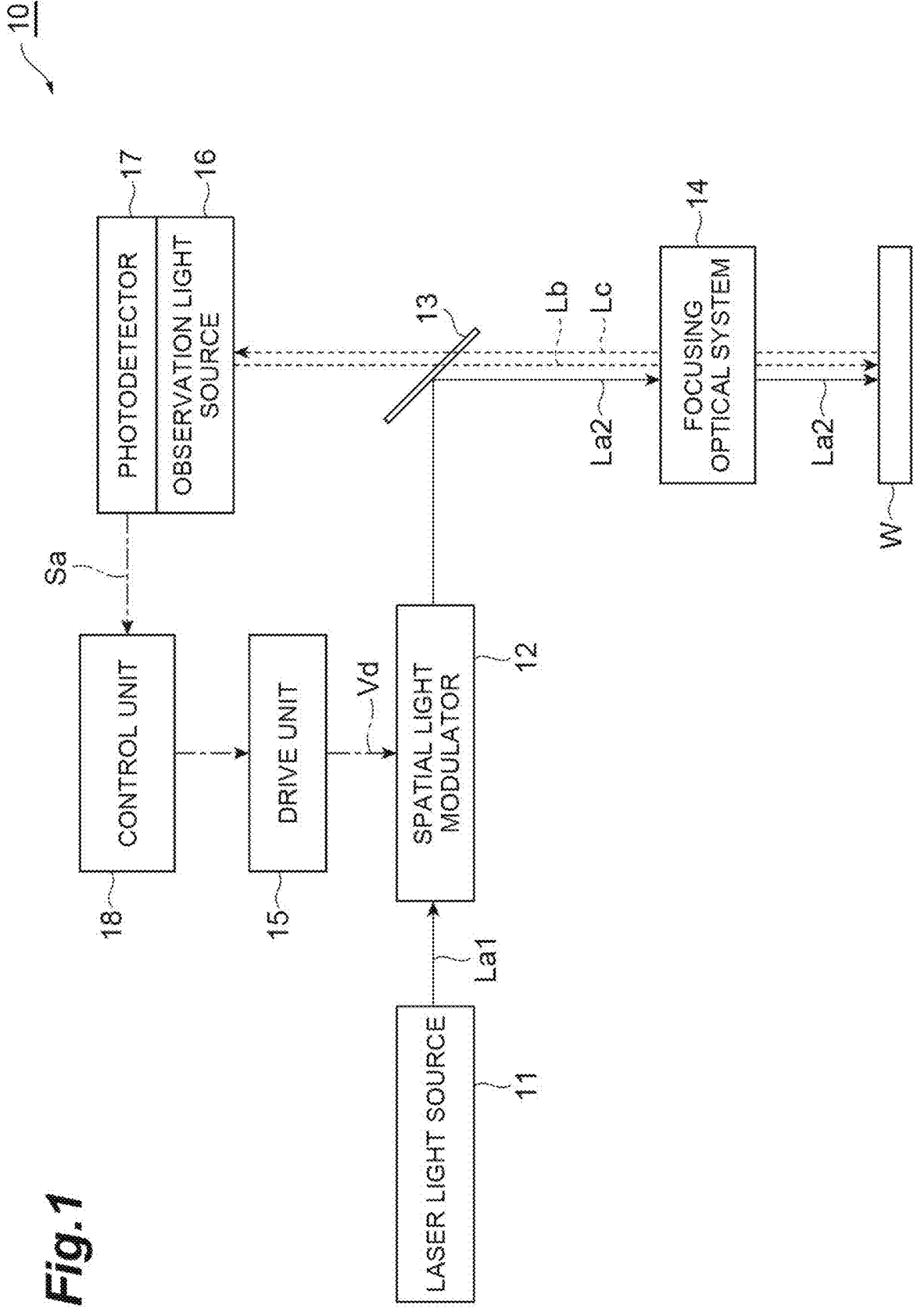
FIG. 1 is a block diagram illustrating a configuration of a laser processing apparatus 10 according to an embodiment.

FIG. 1 is a block diagram illustrating a configuration of a laser processing apparatus 10 according to an embodiment. As illustrated in FIG. 1, the laser processing apparatus 10 according to the present embodiment includes a laser light source 11, a spatial light modulator 12, a dichroic mirror 13, a focusing optical system 14, a drive unit 15, an observation light source 16, a photodetector 17, and a control unit (PC or the like) 18.

The laser light source 11 outputs pulse-shaped laser light La1 having a time width of 1 picosecond or less (for example, several femtoseconds). A wavelength of the laser light La1 output from the laser light source 11 is, for example, 250 nm or more and 2500 nm or less, and is 1030 nm in one example. Further, a power of the laser light La1 output from the laser light source 11 is, for example, 0.01 W or more and 1000 W or less, and is 1 W in one example. The laser light source 11 is, for example, a solid-state laser including a Yb:YAG crystal or a Yb:KGW crystal as a laser medium, or a Yb-doped optical fiber laser excited by a semiconductor laser.

The spatial light modulator 12 is optically coupled to the laser light source 11, and inputs the laser light La1 output from the laser light source 11. The optical coupling between the spatial light modulator 12 and the laser light source 11 is, for example, spatial coupling. The spatial light modulator 12 includes a plurality of pixels arranged two-dimensionally, and modulates a phase of the laser light La1 independently in each pixel by presenting a hologram on the plurality of pixels.

The spatial light modulator 12 has, for example, a liquid crystal type configuration. When the spatial light modulator 12 is the liquid crystal type, individual voltages constituting the hologram are applied to a plurality of pixel electrodes arranged two-dimensionally. Thus, a magnitude of an electric field applied to a liquid crystal layer is controlled for each pixel electrode. An optical path length in the liquid crystal layer of each pixel changes according to the magnitude of the electric field. Therefore, the phase of the laser light La1 can be modulated independently in each pixel.

The spatial light modulator 12 may be a transmission type or may be a reflection type. Further, the configuration of the spatial light modulator 12 is not limited to the liquid crystal type, and spatial light modulators of various configurations may be used. The spatial light modulator 12 outputs laser light La2 after phase modulation performed by the hologram.

The dichroic mirror 13 is an optical element which transmits light included in a certain wavelength range and reflects light included in another wavelength range. One surface of the dichroic mirror 13 is optically coupled to the spatial light modulator 12. The laser light La2 after the modulation reaching the dichroic mirror 13 from the spatial light modulator 12 is reflected (or transmitted) by the dichroic mirror 13 and travels toward a processing object W. The dichroic mirror 13 is, for example, a short-pass dichroic mirror.

The laser light La2 passes through the focusing optical system 14 provided at a subsequent stage of the spatial light modulator 12 (more precisely, at a subsequent stage of the dichroic mirror 13), and reaches the processing object W. The focusing optical system 14 is, for example, a lens made of glass, and is optically coupled to the spatial light modulator 12 via the dichroic mirror 13. The optical coupling of the spatial light modulator 12, the dichroic mirror 13 and the focusing optical system 14 is, for example, spatial coupling. The focusing optical system 14 is disposed on an optical path between the dichroic mirror 13 and the processing object W.

The drive unit 15 is electrically connected to each pixel electrode of the spatial light modulator 12, and provides, to each pixel electrode, a drive voltage Vd for presenting the hologram on the spatial light modulator 12. The drive unit 15 includes a plurality of voltage generation circuits electrically connected to the respective pixel electrodes. Each voltage generation circuit includes an amplifier circuit including a transistor.

The control unit 18 is electrically connected to the drive unit 15. The control unit 18 creates the hologram or reads out the hologram from the storage unit, and provides two-dimensional data of the hologram to the drive unit 15. The drive unit 15 generates a drive signal, being an analog signal based on the hologram, for each pixel. Each amplifier circuit of the drive unit 15 generates the drive voltage Vd by amplifying the drive signal.

Figure 2:
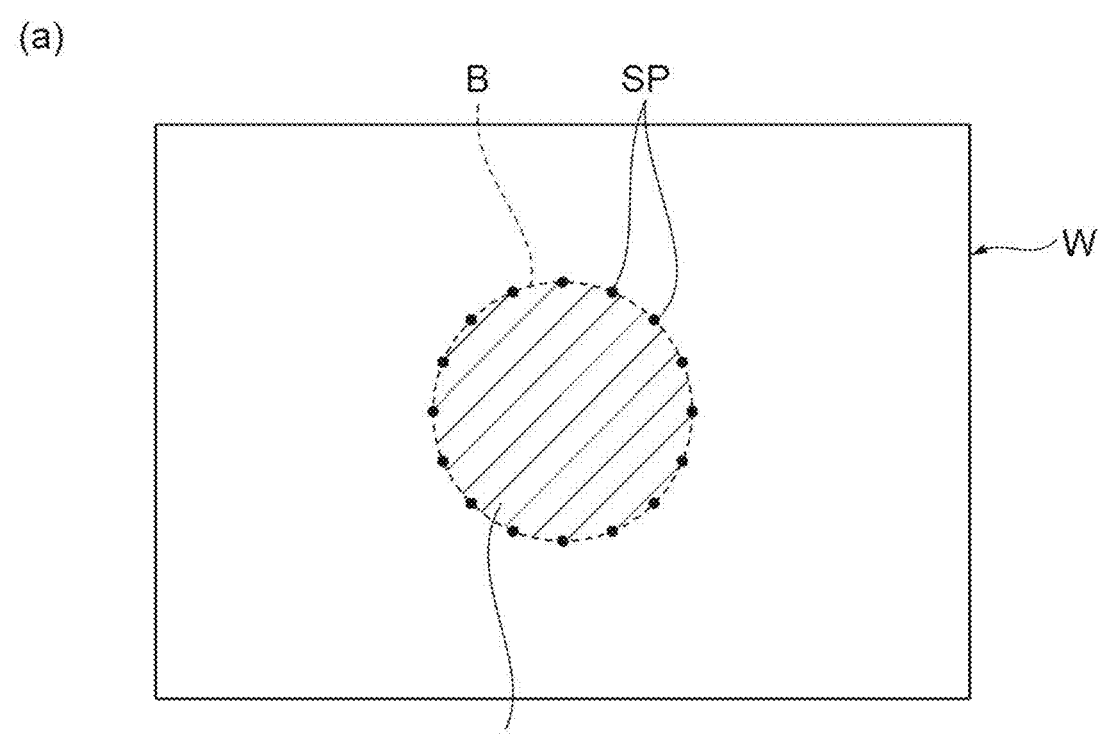
FIG. 2 includes (a) a plan view illustrating laser light La2 after phase modulation with which a processing object W is irradiated through a focusing optical system 14, and (b) an enlarged view of a part of (a).
Figure 2:
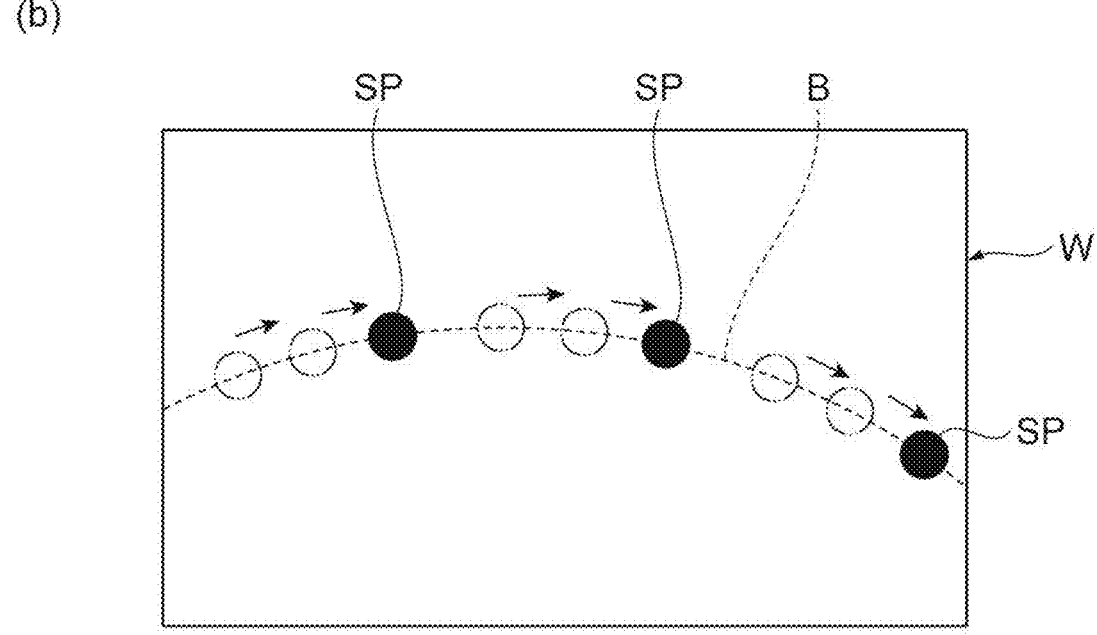

(a) in FIG. 2 is a plan view illustrating the laser light La2 after the phase modulation with which the processing object W is irradiated through the focusing optical system 14. Further, (b) in FIG. 2 is an enlarged view of a part of (a) in FIG. 2. As illustrated in (a) in FIG. 2, the control unit 18 generates the hologram for focusing the laser light La2 after the phase modulation output from the spatial light modulator 12 on a plurality of irradiation points SP of the processing object W by the focusing optical system 14, and presents the hologram on the spatial light modulator 12.

The plurality of irradiation points SP define a processing region A in the processing object W. That is, the plurality of irradiation points SP are arranged at intervals on a closed virtual line B, and the processing region A is determined by the virtual line B. Further, the control unit 18 sequentially presents, on the spatial light modulator 12, a plurality of holograms for changing the position of each irradiation point SP along the virtual line B. Thus, as illustrated in (b) in FIG. 2, each irradiation point SP discretely moves on the virtual line B.

Figure 3:
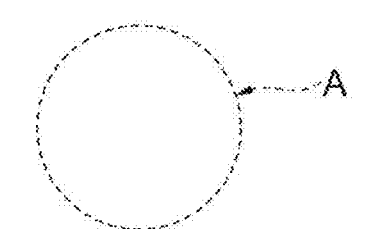
FIG. 3 includes (a)-(e) diagrams illustrating examples of a planar shape of a processing region A.
Figure 3:
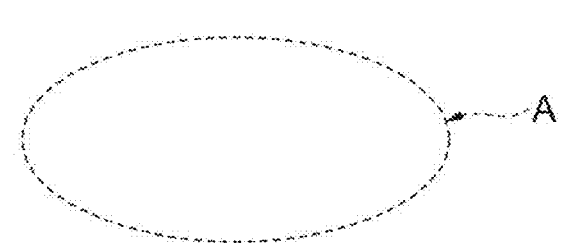
Figure 3:
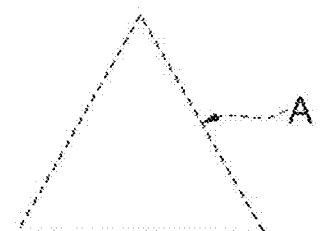
Figure 3:
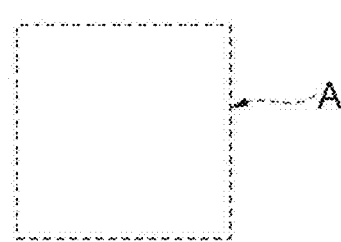
Figure 3:
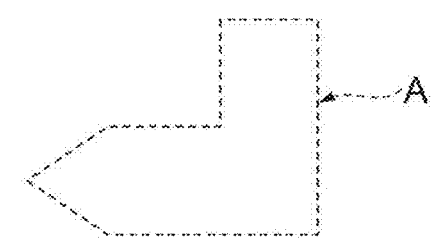

A planar shape (shape in a plane perpendicular to an optical axis of the laser light La2) of the processing region A defined by the plurality of irradiation points SP is variously set according to the purpose of processing or the like. FIG. 3 includes diagrams illustrating examples of the planar shape of the processing region A. The processing region A may have a circular shape as illustrated in (a) in FIG. 3, or may have an elliptical shape as illustrated in (b) in FIG. 3. Further, the processing region A may have a triangular shape as illustrated in (c) in FIG. 3, may have a quadrangular shape as illustrated in (d) in FIG. 3, or may have an arbitrary polygonal shape as illustrated in (e) in FIG. 3.

The control unit 18 controls the light intensities (unit: $W/cm^2$, which may be restated as an energy density (unit: $J/cm^2$)) of at least two irradiation points SP included in the plurality of irradiation points SP independently of each other. In one example, the control unit 18 independently controls the light intensities of all the irradiation points SP. The light intensity of each irradiation point SP is determined, for example, by a processing speed of a material of the processing object W at each irradiation point SP and/or other factors.

For example, in the case of a material whose processing speed is fast (that is, processing is easy) with respect to the laser light La2, the light intensity is decreased to slow down the processing speed. Further, in the case of a material whose processing speed is slow (that is, processing is difficult) with respect to the laser light La2, the light intensity is increased to speed up the processing speed. In this way, even in a case where materials having different processing speeds are mixed in a light irradiation surface or a cross-section of the processing object W, the processing speeds can be made uniform in the plurality of irradiation points SP. Further, for a material being greatly affected by heat, the light intensity may be decreased to minimize a region which is affected by heat.

Further, the control unit 18 controls at least one of the light intensity and an irradiation time (in other words, a hologram presenting time) for each of the plurality of irradiation points SP according to a depth position of each of the plurality of irradiation points SP in the processing object W.

For example, when processing a deeper portion than when processing the light irradiation surface of the processing object W, debris and the like remaining at the time of immediately preceding irradiation of the laser light La2 interferes with irradiation of the laser light La2, and thus, the processing speed decreases. Therefore, the processing speed and the processing quality are improved by increasing the light intensity of the plurality of irradiation points SP and/or increasing the irradiation time as the depth in the processing object W increases. Further, in the case where the processing object W includes a plurality of layers with different materials (for example, a semiconductor, a printed circuit board, or the like), it is possible to perform laser processing under a condition suitable for each layer by controlling a change period or a presenting time of the hologram.

In addition, the processing object W serving as a processing target in the present embodiment can be formed of various substances such as glass, semiconductor, metal (steel material, non-ferrous metal, alloy, or the like), and composite material (carbon fiber reinforced plastic (CFRP) or the like).

FIG. 1 is referred again. The observation light source 16 is a laser light source for irradiating the processing object W with observation light Lb. A wavelength of the observation light Lb output from the observation light source 16 is different from the wavelengths of the laser light La1 and the laser light La2. The wavelength of the observation light Lb is, for example, 800 nm or more and 980 nm or less, and is 808 nm in one example. The observation light source 16 is, for example, an Al(In)GaAs-based or InGaAsP-based semiconductor laser.

The observation light source 16 is optically coupled to the other surface of the dichroic mirror 13. The observation light Lb reaching the dichroic mirror 13 from the observation light source 16 is transmitted (or reflected) through the dichroic mirror 13, travels toward the processing object W along an optical path parallel to the laser light La2, and is applied to the processing object W.

In addition, the optical axis of the observation light Lb and the optical axis of the laser light La2 are illustrated side by side in the diagram, and the optical axis of the observation light Lb and the optical axis of the laser light La2 may coincide with each other. An irradiation region of the observation light Lb on the processing object W includes, for example, the processing region A illustrated in (a) in FIG. 2.

A part of the observation light Lb reaches the processing object W and becomes reflected light Lc, and is output from the processing object W. Since the wavelength of the reflected light Lc is the same as the wavelength of the observation light Lb, the reflected light Lc is transmitted through the dichroic mirror 13. The photodetector 17 is optically coupled to the other surface of the dichroic mirror 13, and detects the reflected light Lc via the dichroic mirror 13.

The photodetector 17 is a two-dimensional image detector or a detector for acquiring three-dimensional information. In the latter case, the photodetector 17 includes, for example, an interference measurement optical system. In this case, the photodetector 17 branches and acquires a part of the observation light Lb output from the observation light source 16 (or acquires back light of a semiconductor laser as the observation light source 16), and detects an interference light image by causing the part (or back light) of the observation light Lb and the reflected light Lc to interfere with each other.

The photodetector 17 is electrically connected to the control unit 18, and provides an electrical signal Sa related to the detection result to the control unit 18. Further, an example of interference measurement used in the present embodiment is described in Non Patent Document 1 (F. Mezzapesa et al., Opt. Lett. Vol. 36, pp. 822-824 (2011)).

The control unit 18 determines the processing state at each irradiation point SP based on the detection result from the photodetector 17. Further, the control unit 18 controls the hologram presented on the spatial light modulator 12 according to the processing state. The control of the hologram includes, for example, control of the presenting time of the hologram, change to an appropriate hologram, and the like.

Figure 4:
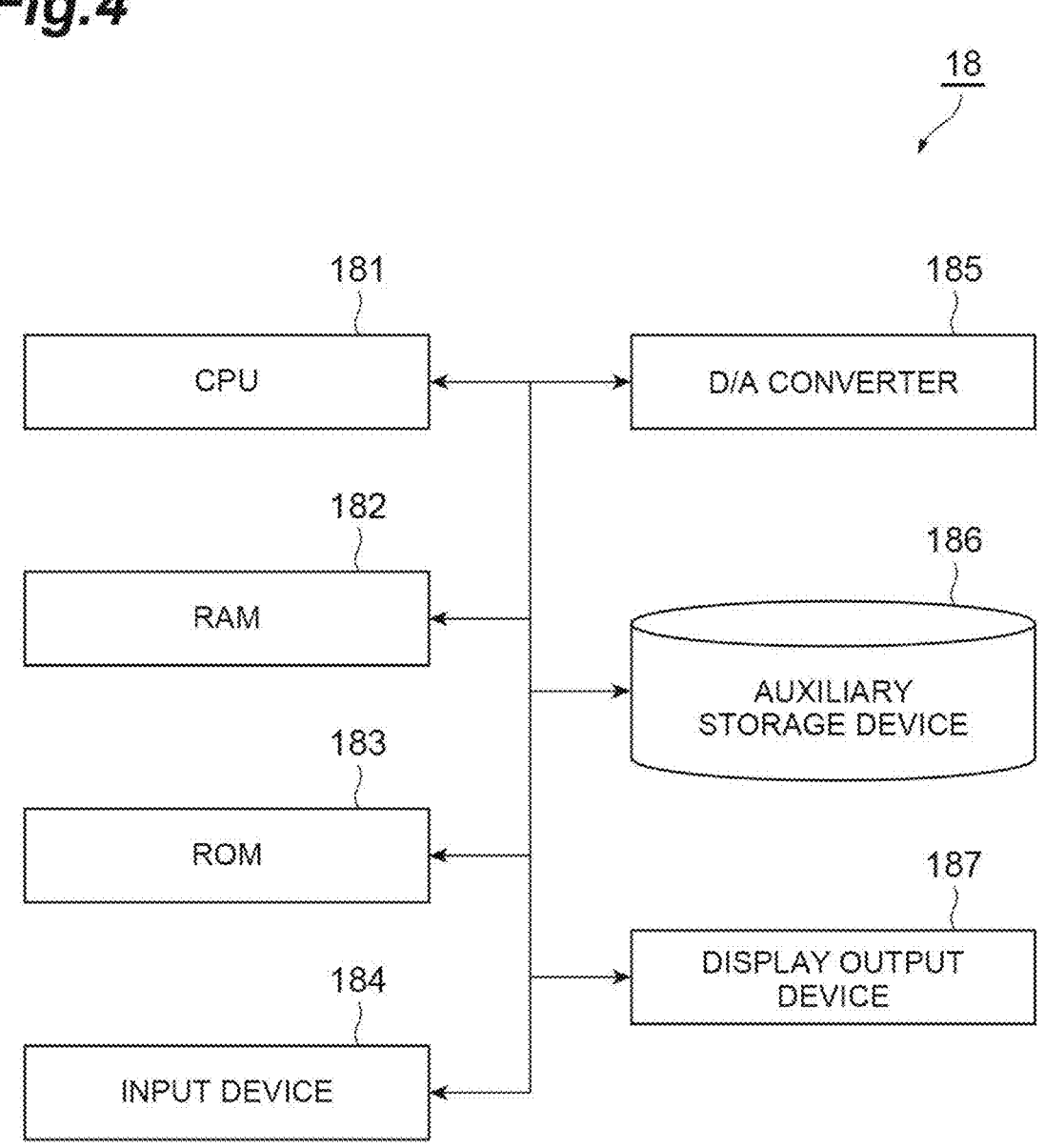
FIG. 4 is a block diagram illustrating a hardware configuration example of a control unit 18.

FIG. 4 is a block diagram illustrating a hardware configuration example of the control unit 18. As illustrated in FIG. 4, the control unit 18 is configured to include a computer including hardware such as a CPU 181, a RANI 182, a ROM 183, an input device 184, a digital/analog converter 185, an auxiliary storage device 186, and a display output device 187. The control unit 18 implements the above-described functions by operating these components by a program and the like stored in advance in the auxiliary storage device 186.

Figure 5:
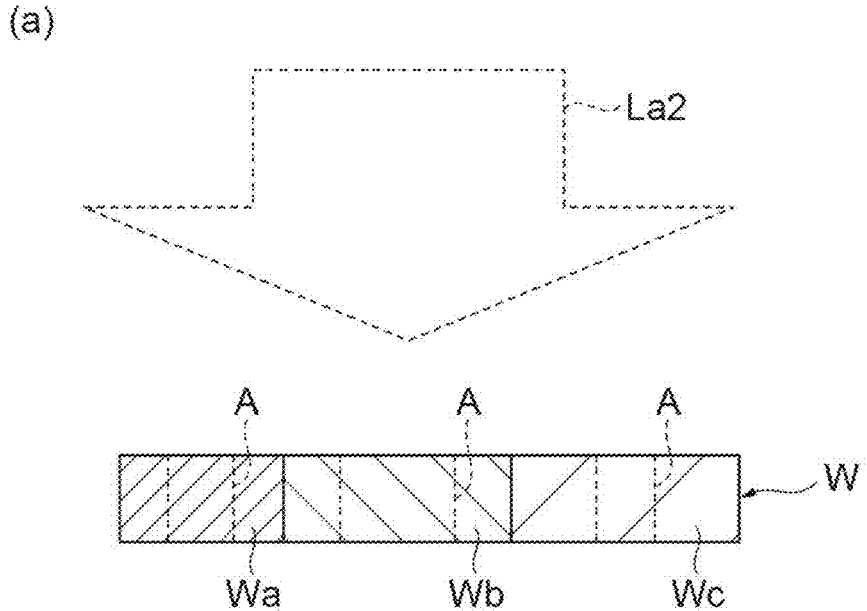
FIG. 5 includes (a) a cross-sectional view illustrating a state in which the processing object W including a plurality of regions Wa, Wb, and Wc with different materials is irradiated with the laser light La2, and (b) a plan view illustrating a laser irradiation surface of the processing object W.
Figure 5:
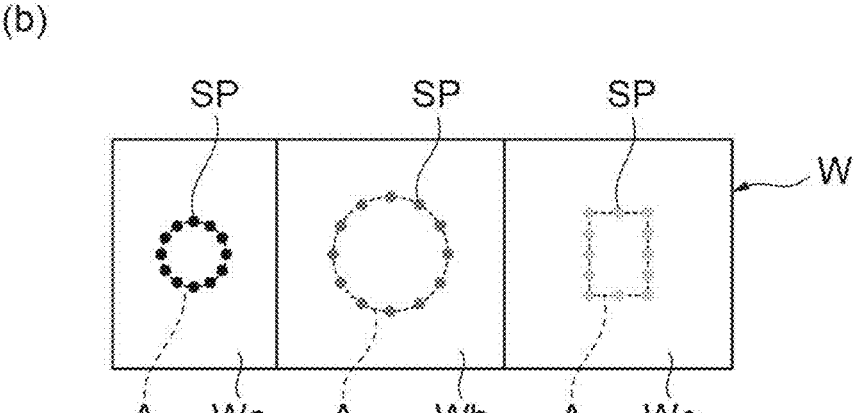
Figure 6:
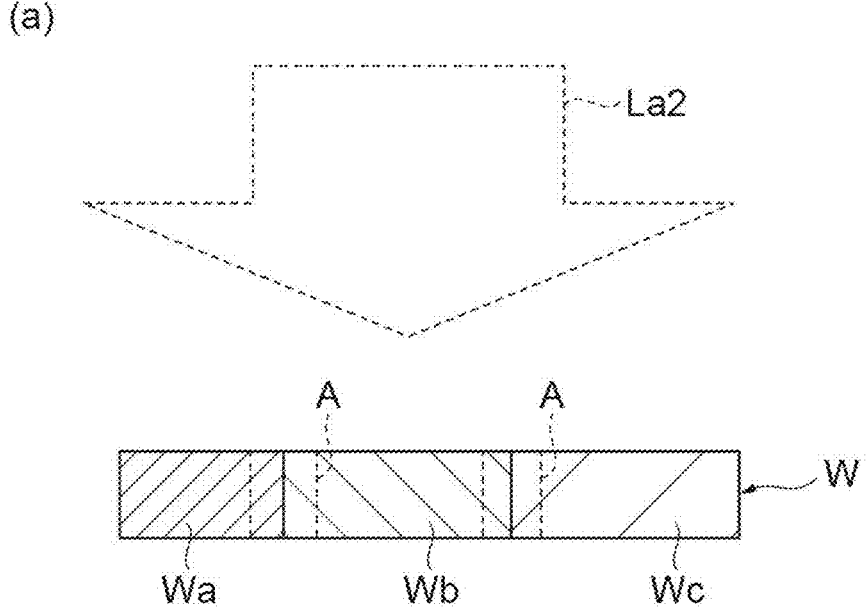
FIG. 6 includes (a) a cross-sectional view illustrating a state in which the processing object W including the plurality of regions Wa, Wb, and Wc with different materials is irradiated with the laser light La2, and (b) a plan view illustrating the laser irradiation surface of the processing object W.
Figure 6:
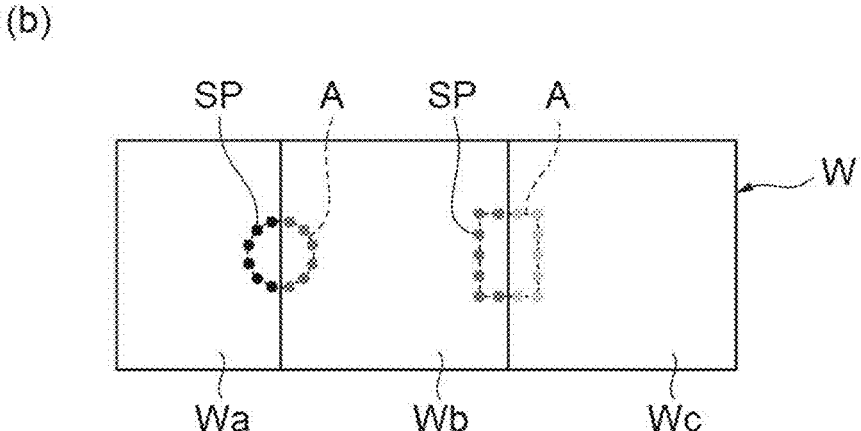

Hereinafter, examples of the processing by the laser processing apparatus 10 of the present embodiment will be described. each of (a) in FIG. 5 and (a) in FIG. 6 is a cross-sectional view illustrating a state in which the processing object W including a plurality of regions Wa, Wb, and Wc with different materials is irradiated with the laser light La2, and illustrates a cross-section along the optical axis of the laser light La2 (in other words, along the thickness direction of the processing object W). each of (b) in FIG. 5 and (b) in FIG. 6 is a plan view illustrating the light irradiation surface of the processing object W.

In these examples, the regions Wa, Wb, and Wc are arranged in a direction intersecting the optical axis direction of the laser light La2 (thickness direction of the processing object W), and boundary lines of the regions Wa, Wb, and Wc are exposed on the light irradiation surface. The processing speeds for the materials of the regions Wa, Wb, and Wc with respect to the laser light La2 having the same light intensity are different from each other. Specifically, for the laser light La2 having the same light intensity, the processing speed for the region Wa is the slowest, and the processing speed for the region Wc is the fastest.

In the example illustrated in FIG. 5, three processing regions A independent of each other are set respectively for the regions Wa, Wb, and Wc. Further, a plurality of irradiation points SP for determining one processing region A are formed in the region Wa, a plurality of irradiation points SP for determining another processing region A are formed in the region Wb, and a plurality of irradiation points SP for determining still another processing region A are formed in the region Wc.

In the example illustrated in FIG. 6, a processing region A provided on the regions Wa and Wb and another processing region A provided on the regions Wb and Wc are set. Further, a plurality of irradiation points SP for determining a part of the one processing region A are formed in the region Wa, a plurality of irradiation points SP for determining the remaining part of the one processing region A and a plurality of irradiation points SP for determining a part of the other processing region A are formed in the region Wb, and a plurality of irradiation points SP for determining the remaining part of the other processing region A are formed in the region Wc.

In this case, as illustrated in (b) in FIG. 5 and (b) in FIG. 6, the control unit 18 controls the hologram to be presented on the spatial light modulator 12 such that the light intensity of the irradiation points SP formed in the region Wa is largest and the light intensity of the irradiation points SP formed in the region Wc is smallest. In addition, in (b) in FIG. 5 and (b) in FIG. 6, the light intensity of each irradiation point SP is represented by light and shade of color. The darker the color, the higher the light intensity, and the lighter the color, the lower the light intensity.

Thus, the processing speeds for the irradiation points SP in the regions Wa, Wb, and Wc can be brought close to each other, and the processing depths can be made uniform. Ideally, relative relationship between the light intensities of the respective irradiation points SP is adjusted such that the processing speeds at the irradiation points SP are equal to each other.

In the examples illustrated in FIG. 5 and FIG. 6, the control unit 18 may detect the material at each irradiation point SP based on the detection result by the photodetector 17 illustrated in FIG. 1. The reflectance for the observation light Lb depends on the material, and thus, the material at each irradiation point SP can be known based on the intensity ratio between the observation light Lb and the reflected light Lc. Therefore, the boundaries of the regions Wa, Wb, and Wc can be detected.

Further, the spatial light modulator 12 may present the hologram for realizing the light intensities of the irradiation points SP respectively corresponding to the regions Wa, Wb, and Wc. In other words, in this example, the control unit 18 may generate the hologram for setting the light intensities of the irradiation points SP independently of each other based on the detection result by the photodetector 17.

Further, data related to the light intensity of each irradiation point SP according to the distribution of the regions Wa, Wb, and Wc may be stored in advance in the storage unit (for example, the ROM 183 or the auxiliary storage device 186 illustrated in FIG. 4). In this case, the control unit 18 can control the light intensity of each irradiation point SP based on the data.

Figure 7:
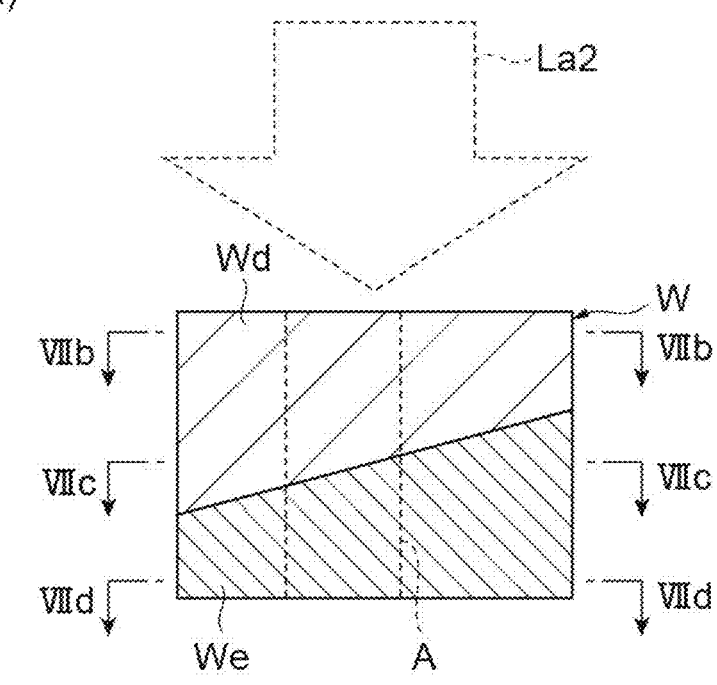
FIG. 7 includes (a) a cross-sectional view illustrating a state in which the processing object W including a plurality of regions Wd and We with different materials is irradiated with the laser light La2, and (b)-(d) cross-sectional views taken along a line VIIb-VIIb, a line VIIc-VIIc, and a line VIId-VIId in (a).
Figure 7:
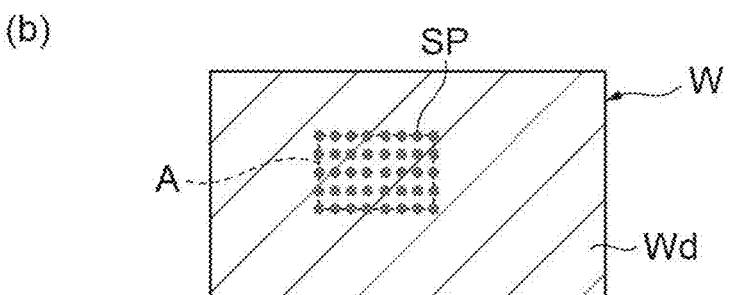
Figure 7:
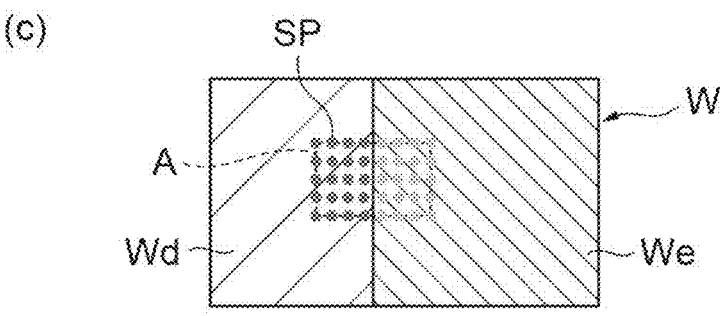
Figure 7:
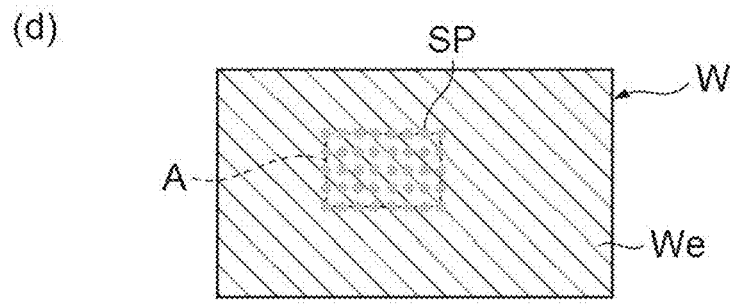

(a) in FIG. 7 is a cross-sectional view illustrating a state in which the processing object W including a plurality of regions Wd and We with different materials is irradiated with the laser light La2, and illustrates a cross-section along the optical axis of the laser light La2 (in other words, along the thickness direction of the processing object W). (b), (c), and (d) in FIG. 7 are cross-sectional views taken along a line VIIb-VIIb, a line VIIc-VIIc, and a line VIId-VIId in (a) in FIG. 7, respectively, and illustrates cross-sections perpendicular to the optical axis of the laser light La2.

In this example, the regions Wd and We are arranged in the optical axis direction of the laser light La2, and a boundary surface of the regions Wd and We is inclined with respect to a virtual plane perpendicular to the optical axis direction of the laser light La2. The processing speeds for the materials of the regions Wd and We with respect to the laser light La2 having the same light intensity are different from each other. Specifically, for the laser light La2 having the same light intensity, the processing speed for the region Wd is slower than the processing speed for the region We.

In this example, a processing region A is set for the processing object W, and a plurality of irradiation points SP for determining the processing region A are formed in the processing object W. In addition, also in (b), (c), and (d) in FIG. 7, the light intensity of each irradiation point SP is represented by light and shade of color. The darker the color, the higher the light intensity, and the lighter the color, the lower the light intensity.

First, at the timing illustrated in (b) in FIG. 7, the control unit 18 controls the hologram presented on the spatial light modulator 12 such that the processing speed of each irradiation point SP in the region Wd becomes an arbitrary speed. When the processing proceeds to a certain depth, as illustrated in (c) in FIG. 7, the processing region A is provided on the region Wd and the region We. In this case, the control unit 18 controls the hologram presented on the spatial light modulator 12 such that the light intensity of the irradiation point SP located in the region We becomes smaller than the light intensity of the irradiation point SP located in the region Wd.

When the processing further proceeds, a ratio of the region We in the processing region A gradually increases, and finally, as illustrated in (d) in FIG. 7, only the region We is included in the processing region A. In this case, the control unit 18 controls the hologram presented on the spatial light modulator 12 such that the processing speed of each irradiation point SP in the region We becomes an arbitrary speed.

In this example, the control unit 18 controls the hologram such that the light intensity of the irradiation point SP formed in the region Wd is larger than the light intensity of the irradiation point SP formed in the region We. Thus, at the timing ((c) in FIG. 7) at which the regions Wd and We are mixed in the processing region A, the processing speeds for the irradiation points SP in the regions Wd and We can be brought close to each other, and the processing depths can be made uniform. Ideally, the light intensities of the respective irradiation points SP are adjusted such that the processing speeds at the irradiation points SP become equal in the depth direction.

In the example illustrated in FIG. 7, the control unit 18 may detect a material change at each irradiation point SP based on the detection result by the photodetector 17 illustrated in FIG. 1. The reflectance for the observation light Lb depends on the material, and thus, when the material at each irradiation point SP changes, an intensity ratio between the observation light Lb and the reflected light Lc changes. Therefore, the material change from the region Wd to the region We can be detected.

Further, at the timing of the above change, the spatial light modulator 12 may present the hologram for changing the light intensity for the irradiation point SP changed from the region Wd to the region We. In other words, in this example, a change timing of the hologram for changing the light intensity of each irradiation point SP may be determined based on the detection result by the photodetector 17.

Further, data related to the light intensity of each irradiation point SP according to a material distribution in the processing object W may be stored in advance in the storage unit (for example, the ROM 183 or the auxiliary storage device 186 illustrated in FIG. 4). In this case, the control unit 18 can control the light intensity of each irradiation point SP based on the data.

Figure 8:
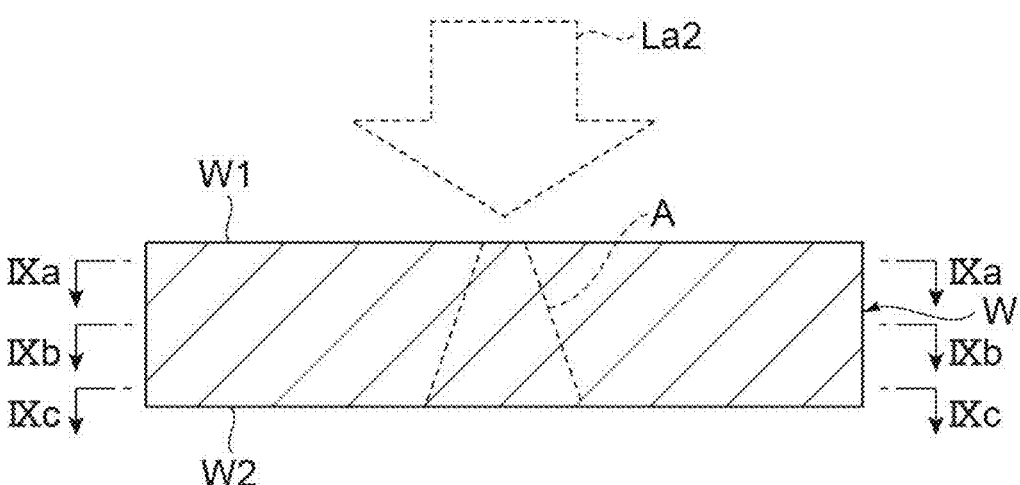
FIG. 8 includes (a) a cross-sectional view illustrating a state in which the processing object W is irradiated with the laser light La2, and (b) a cross-sectional view illustrating a hole Ha formed in the processing object W.
Figure 8:
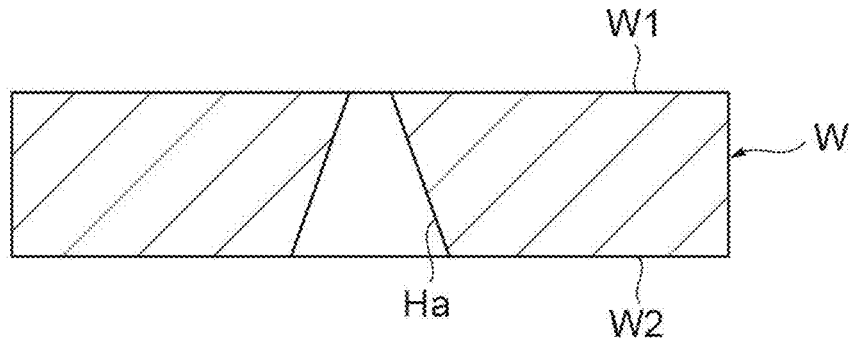

(a) in FIG. 8 is a cross-sectional view illustrating a state in which the processing object W is irradiated with the laser light La2, and illustrates a cross-section along the optical axis of the laser light La2. (b) in FIG. 8 is a cross-sectional view illustrating a hole Ha formed in the processing object W. In the example illustrated in FIG. 8, a size of the processing region A continuously changes in the optical axis direction of the laser light La2 from a light irradiation surface W1 of the processing object W to an opposite surface W2. Continuous change of the size of the processing region A means that there is no step in the contour of the processing region A in a cross-section along the optical axis direction of the laser light La2.

In this example, the hologram is sequentially switched as the processing proceeds in the optical axis direction of the laser light La2 (depth direction of the processing object W). Each hologram is configured by superimposing a hologram for realizing the size and the shape of the processing region A in a plane intersecting the optical axis of the laser light La2 and a hologram for the position in the optical axis direction of the plane.

Figure 9:
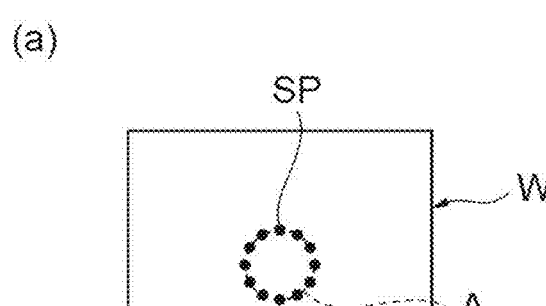
FIG. 9 includes (a)-(c) diagrams schematically illustrating an arrangement example of irradiation points SP in cross-sections taken along a line IXa-IXa, a line IXb-IXb, and a line IXc-IXc illustrated in (a) in FIG. 8.
Figure 9:
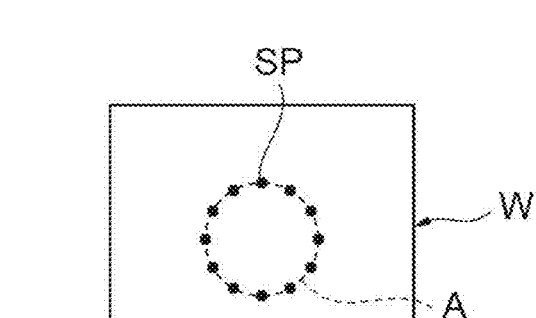
Figure 9:
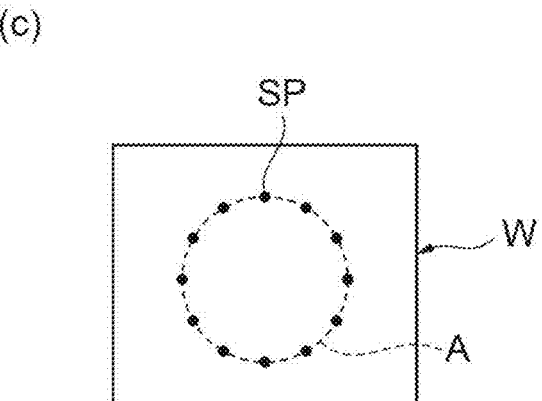

(a), (b), and (c) in FIG. 9 schematically illustrate arrangement examples of the irradiation points SP in cross-sections along a line IXa-IXa, a line IXb-IXb, and a line IXc-IXc illustrated in (a) in FIG. 8. In this example, the shape of the processing region A in the cross-section perpendicular to the optical axis direction of the laser light La2 is a circular shape.

Figure 10:
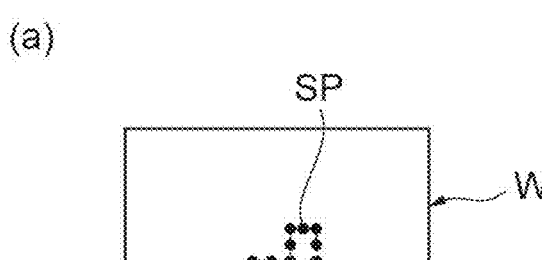
FIG. 10 includes (a)-(c) diagrams schematically illustrating another arrangement example of the irradiation points SP in the cross-sections.
Figure 10:
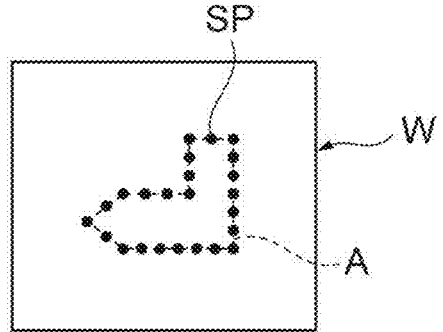
Figure 10:
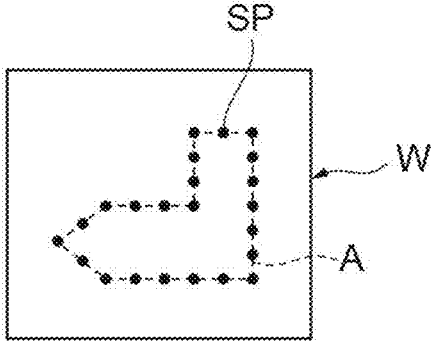

Further, (a), (b), and (c) in FIG. 10 schematically illustrate other arrangement examples of the irradiation points SP in the respective cross-sections. In this example, the shape of the processing region A in the cross-section perpendicular to the optical axis direction of the laser light La2 is an arbitrary complicated polygonal shape.

The irradiation points SP illustrated in FIG. 9 and FIG. 10 determine the processing region A illustrated in (a) in FIG. 8. In addition, the shape of the processing region A in the cross-section perpendicular to the optical axis direction of the laser light La2 is not limited to the examples of FIG. 9 and FIG. 10, and various other shapes are possible.

In the example illustrated in FIG. 8, from another viewpoint, the control unit 18 sets the sizes of the processing region A to be different from each other in the IXa-IXa cross-section and the IXb-IXb cross-section which are separated from each other in the optical axis direction. In this case, one of the IXa-IXa cross-section and the IXb-IXb cross-section corresponds to a first plane in the present embodiment, and the other corresponds to a second plane in the present embodiment.

Further, from still another viewpoint, the control unit 18 sets the sizes of the processing region A to be different from each other in the IXb-IXb cross-section and the IXc-IXc cross-section which are separated from each other in the optical axis direction. In this case, one of the IXb-IXb cross-section and the IXc-IXc cross-section corresponds to the first plane in the present embodiment, and the other corresponds to the second plane in the present embodiment.

In addition, also in this example, the control unit 18 sequentially presents, on the spatial light modulator 12, a plurality of holograms for changing the position of each irradiation point SP along the virtual line B (see (b) in FIG. 2) which determines the processing region A in each cross-section. Thus, each irradiation point SP discretely moves on the contour line of the processing region A.

The control unit 18 may determine the processing state at each irradiation point SP based on the detection result by the photodetector 17, and control the presenting time of the hologram in each cross-section according to the processing state. The processing state is, for example, the processing speed (in other words, progress of the processing) or the like at each irradiation point SP.

When the processing object W has a light transmitting property for the laser light La2, as illustrated in FIG. 8, the inversely tapered processing region A for the light irradiation surface W1 of the processing object W (tapered for the surface W2) may be set. In other words, an area of the processing region A in one cross-section distant from the light irradiation surface W1 of the processing object W out of the IXa-IXa cross-section and the IXb-IXb cross-section (or the IXb-IXb cross-section and the IXc-IXc cross-section) may be larger than an area of the processing region A in the other cross-section.

In this case, the control unit 18 presents, on the spatial light modulator 12, a hologram for focusing the laser light La2 on each irradiation point SP, so that a contour portion of the processing region A is cut off, and the processing region A falls down from the processing object W. As a result, as illustrated in (b) in FIG. 8, the hole Ha, which is an inversely tapered through hole with respect to the light irradiation surface W1, is formed in the processing object W.

When the processing object W is made of a material such as glass having a light transmitting property for the laser light La2, the processing may be sequentially performed from the side of the surface W2 opposite to the light irradiation surface W1 of the processing object W toward the light irradiation surface W1. The above processing is possible by setting the light intensity larger than the processing threshold value only in the focusing point of the laser light La2, and setting the light intensity smaller than the processing threshold value in the other region (region between the light irradiation surface W1 and the focusing point) in the processing object W.

In this case, the laser processing can be performed while causing remainders (debris and fragments) generated by the laser processing to fall downward, and thus, the degree in which the remainders interfere with irradiation of the laser light La2 is reduced.

Figure 11:
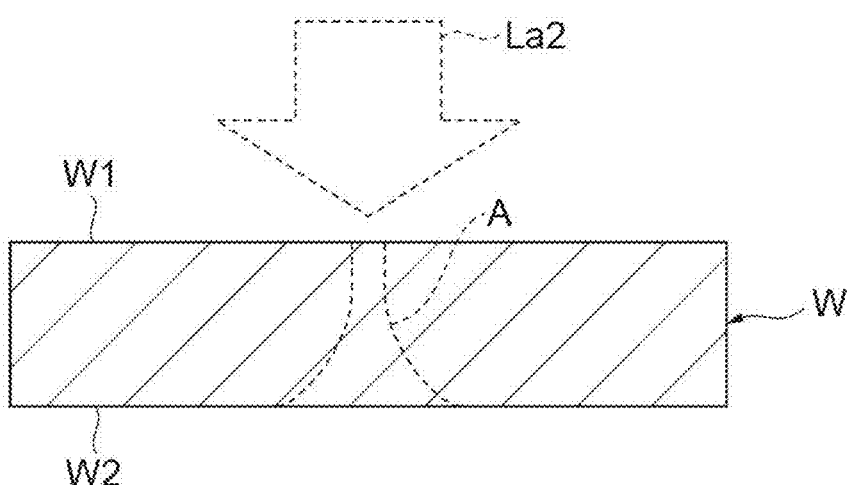
FIG. 11 includes (a) a cross-sectional view illustrating a state in which the processing object W is irradiated with the laser light La2, and (b) a cross-sectional view illustrating a hole Hb formed in the processing object W.
Figure 11:
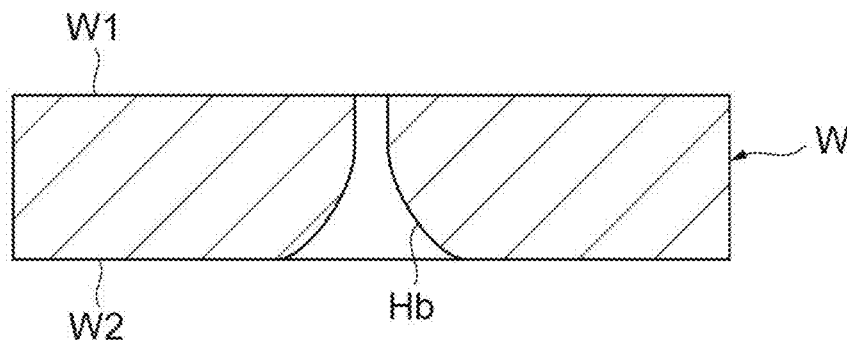

(a) in FIG. 11 is a cross-sectional view illustrating a state in which the processing object W is irradiated with the laser light La2, and illustrates a cross-section along the optical axis of the laser light La2. (b) in FIG. 11 is a cross-sectional view illustrating a hole Hb formed in the processing object W. In the example illustrated in FIG. 11, as in the example illustrated in FIG. 8, a size of the processing region A in the cross-section perpendicular to the optical axis of the laser light La2 continuously changes in the optical axis direction of the laser light La2 from the light irradiation surface W1 of the processing object W to the opposite surface W2.

Specifically, the size of the processing region A in the cross-section gradually increases as a distance from the light irradiation surface W1 increases. In addition, in the example illustrated in FIG. 11, the contour of the processing region A in the cross-section along the optical axis of the laser light La2 is not linear as illustrated in FIG. 8, but has a shape (for example, an arc shape) having a inwardly convex curvature.

In this case also, the control unit 18 presents, on the spatial light modulator 12, a hologram for focusing the laser light La2 on each irradiation point SP, so that a contour portion of the processing region A is cut off, and the processing region A falls down from the processing object W. As a result, as illustrated in (b) in FIG. 11, the hole Hb, which is an inversely tapered through hole with respect to the light irradiation surface W1, is formed in the processing object W.

Figure 12:
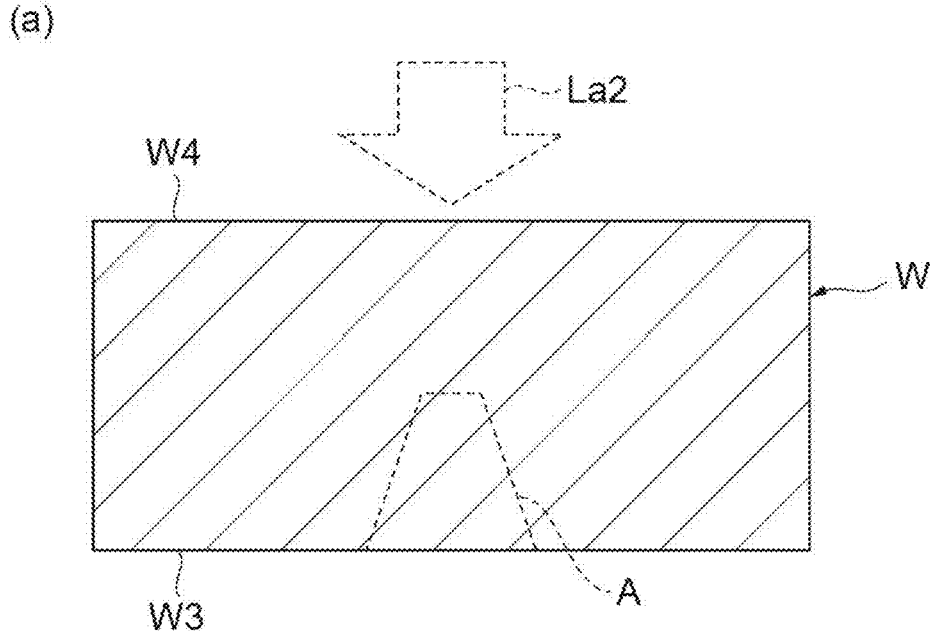
FIG. 12 includes (a) a cross-sectional view illustrating a state in which the processing object W is irradiated with the laser light La2, and (b) a cross-sectional view illustrating a hole Hc formed in the processing object W.
Figure 12:
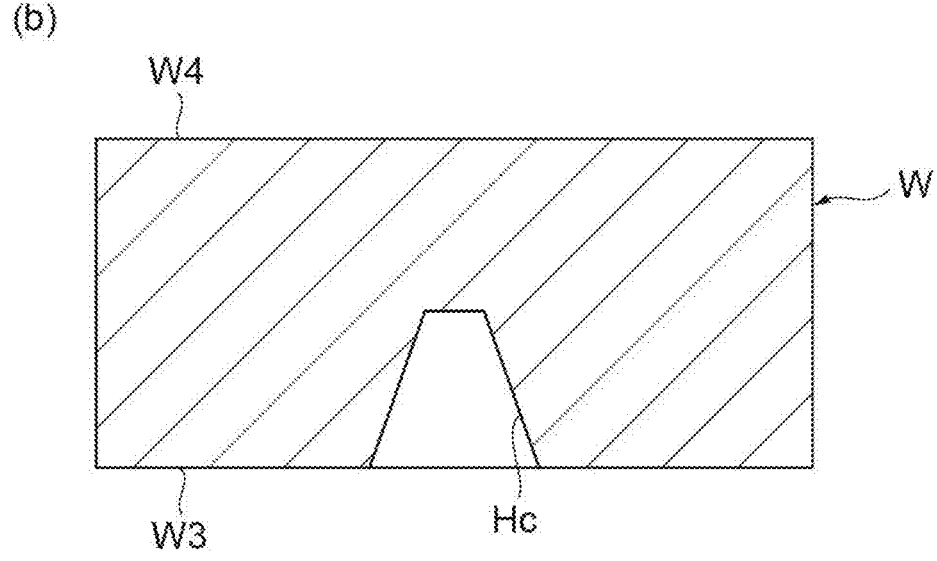
Figure 13:
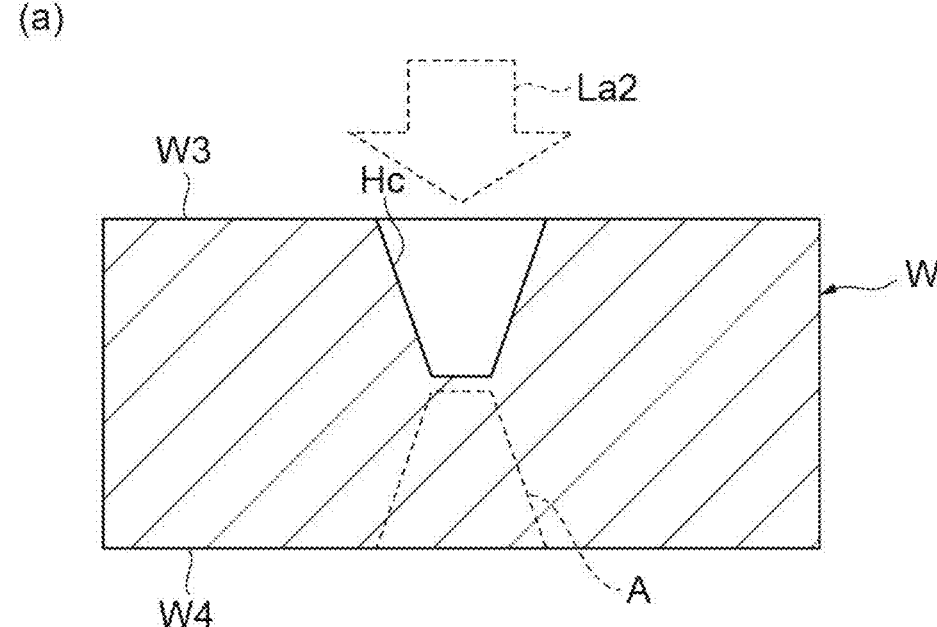
FIG. 13 includes (a) a cross-sectional view illustrating a state in which the processing object W is irradiated with the laser light La2, and (b) a cross-sectional view illustrating holes Hc and Hd formed in the processing object W.
Figure 13:
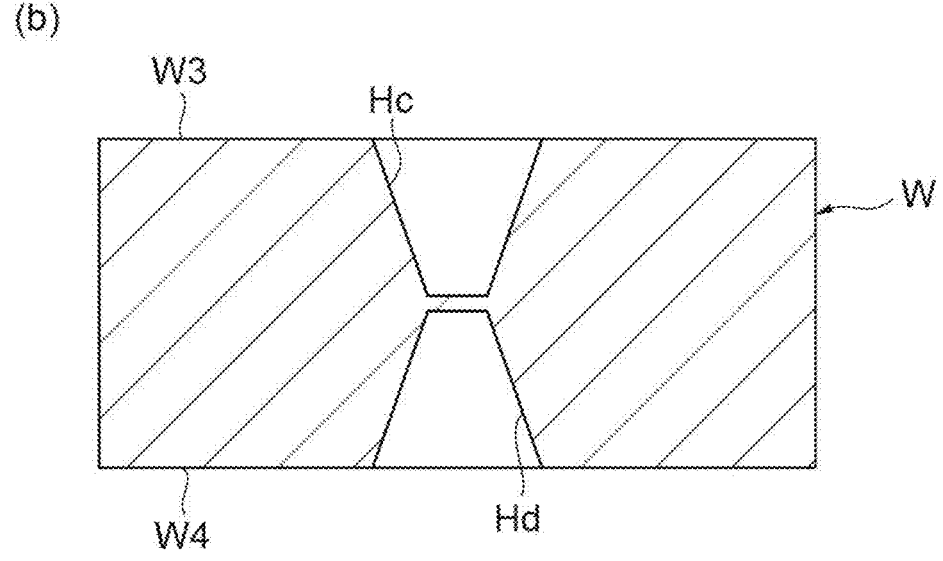

(a) in each of FIG. 12 to FIG. 14 is a cross-sectional view illustrating a state in which the processing object W is irradiated with the laser light La2, and illustrates a cross-section along the optical axis of the laser light La2. (b) in each of FIG. 12 to FIG. 14 is a cross-sectional view illustrating holes Hc, Hd, and He formed in the processing object W.

In this example, first, as illustrated in (a) in FIG. 12, a tapered processing region A reaching one surface W3 from a substantially central portion of the processing object W in the optical axis direction of the laser light La2 is set. Further, the laser light La2 is applied from the other surface W4 on the side opposite to the surface W3, and a contour portion of the processing region A is cut off in the same manner as the example illustrated in FIG. 8, thereby forming a hole Hc illustrated in (b) in FIG. 12. The hole Hc is a tapered (mortar-shaped) depressed portion extending from the substantially central portion of the processing object W to the one surface W3.

Next, as illustrated in (a) in FIG. 13, the processing object W is turned upside down, and a tapered another processing region A reaching the other surface W4 from a substantially central portion of the processing object W in the optical axis direction of the laser light La2 is set. Further, the laser light La2 is applied from the one surface W3, and a contour portion of the processing region A is cut off in the same manner as the example illustrated in FIG. 8, thereby forming a hole Hd illustrated in (b) in FIG. 13. The hole Hd is a tapered (mortar-shaped) depressed portion extending from the substantially central portion of the processing object W to the other surface W4.

Finally, as illustrated in (a) in FIG. 14, still another processing region A connecting the hole Hc and the hole Hd is set. Further, the laser light La2 is applied from the surface W3 or W4, and a contour portion of the processing region A is cut off in the same manner as the example illustrated in FIG. 8, thereby forming a hole He illustrated in (b) in FIG. 14. In this way, a through hole between the one surface W3 and the other surface W4 of the processing object W is formed.

In addition, in the above example, the contour of each processing region A in the cross-section along the optical axis of the laser light La2 is linear, but at least one of them may have a curvature. (a) in FIG. 15 illustrates a cross-sectional shape of a through hole Hf formed when two processing regions A have curvatures. The through hole Hf is formed by communicating a hole Hfa reaching the surface W3 from a substantially central portion of the processing object W and a hole Hfb reaching the surface W4 from the substantially central portion of the processing object W.

A size of the hole Hfa in a cross-section perpendicular to the optical axis of the laser light La2 gradually increases from the substantially central portion of the processing object W toward the surface W3. A size of the hole Hfb in a cross-section perpendicular to the optical axis of the laser light La2 gradually increases from the substantially central portion of the processing object W toward the surface W4. Further, side surfaces of the holes Hfa and Hfb have inwardly convex curvatures in a cross-section along the thickness direction of the processing object W.

Further, (b) in FIG. 15 illustrates a cross-sectional shape of a through hole Hg formed when a contour of one processing region A has a curvature. The through hole Hg is formed by communicating a hole Hga reaching the surface W3 from a substantially central portion of the processing object W and a hole Hgb reaching the surface W4 from the substantially central portion of the processing object W.

A size of the hole Hga in a cross-section perpendicular to the optical axis of the laser light La2 gradually increases from the substantially central portion of the processing object W toward the surface W3. Further, a side surface of the hole Hga has an inwardly convex curvature in a cross-section along the thickness direction of the processing object W. The hole Hgb has a tapered shape (mortar shape) when viewed from the surface W4, as in the hole Hc illustrated in FIG. 12 and the hole Hd illustrated in FIG. 13.

(a) in FIG. 16 is a cross-sectional view illustrating a hole Hh formed by irradiation of the laser light La2, and illustrates a cross-section along the thickness direction of the processing object W. (b) in FIG. 16 is a plan view illustrating a shape of the hole Hh on the light irradiation surface W1 of the processing object W, and (c) in FIG. 16 is a plan view illustrating a shape of the hole Hh on the surface W2 opposite to the light irradiation surface W1 of the processing object W.

In this example, the shape of the hole Hh on the light irradiation surface W1 (first plane intersecting the optical axis of the laser light La2) and the shape of the hole Hh on the surface W2 opposite to the light irradiation surface W1 (second plane separated from the first plane in the optical axis direction) are different from each other. In the illustrated example, the shape of the hole Hh in the light irradiation surface W1 is a circular shape, and the shape of the hole Hh in the opposite surface W2 is an equilateral triangular shape.

The above hole Hh may be preferably formed by the control unit 18 setting the shapes of the processing region A defined by the plurality of irradiation points in the planes of the light irradiation surface W1 and the surface W2 different from each other. In one example, a cross-sectional shape of the hole Hh perpendicular to the thickness direction of the processing object W changes continuously along the thickness direction of the processing object W.

FIG. 17 includes diagrams conceptually illustrating a change of the shape of the processing region A in the optical axis direction of the laser light La2 for forming the hole Hh illustrated in FIG. 16. (a) in FIG. 17 illustrates an outline of a configuration for irradiating the processing object W with the laser light La2 and a cross-section of the processing object W in the optical axis direction of the laser light La2. (b), (c), (d), and (e) in FIG. 17 illustrate the shape of the processing region A in each plane located at different depths in the processing object W, and the plurality of irradiation points SP in each plane.

As illustrated in (b) in FIG. 17, the shape of the processing region A on the light irradiation surface W1 is a circular shape, and as illustrated in (c) to (e) in FIG. 17, the shape of the processing region A gradually approaches a triangular shape from a circular shape as the distance from the light irradiation surface W1 increases in the optical axis direction. Finally, the shape of the processing region A on the surface W2 becomes a triangular shape. In addition, as described above, when the processing object W has a light transmitting property, the processing may be performed from the surface W2 side toward the light irradiation surface W1.

FIG. 18 to FIG. 21 include diagrams illustrating examples of holograms corresponding to the planes illustrated in (b) to (e) in FIG. 17. (a) in each of FIG. 18 to FIG. 21 illustrates the plurality of irradiation points SP illustrated in each of (b) to (e) in FIG. 17. (b), (c), and (d) in each of FIG. 18 to FIG.

21 illustrate examples of the holograms for realizing the plurality of irradiation points SP illustrated in (a). In addition, in (b), (c), and (d) in FIG. 18 to FIG. 21, a magnitude of the phase is represented by light and shade of color, and the darker the color, the smaller the phase (close to 0 radian), and the lighter the color, the larger the phase (close to $2\pi$ radian).

Further, in each of FIG. 18 to FIG. 21, (b), (c), and (d) illustrate a plurality of holograms for changing the position of each irradiation point SP along the contour line (virtual line B illustrated in FIG. 2) of the processing region A. As indicated by arrows in the diagram, the control unit 18 performs the processing while moving the position of each irradiation point SP along the contour line of the processing region A by periodically and repeatedly presenting the holograms illustrated in (b), (c), and (d) on the spatial light modulator 12.

In each processing example illustrated in FIG. 7 to FIG. 17, it is necessary to change the hologram in the middle of the laser processing. Further, when the hologram is changed, it takes time to call the hologram to be presented next from the storage unit (for example, the ROM 183 or the auxiliary storage device 186 illustrated in FIG. 4) or to generate the hologram to be presented next by calculation based on the detection result by the photodetector 17.

The control unit 18 presents, on the spatial light modulator 12, a hologram with which the light intensity of the laser light La2 is less than the processing threshold value at any portion in the processing object W during a period from erasing a certain hologram to presenting another hologram. For example, as illustrated in FIG. 22, the control unit 18 may presents, on the spatial light modulator 12, a hologram for forming the irradiation point SP of the laser light La2 farther than the processing object W. Thus, it is possible to realize an operation equivalent to that when the laser light source 11 is turned off.

Further, in each plane arranged in the optical axis direction of the laser light La2 in each processing example illustrated in FIG. 8 to FIG. 17, the control unit 18 may independently control the light intensities of the plurality of irradiation points SP for each irradiation point SP, as in each processing example illustrated in FIG. 5 to FIG. 7. Further, the control unit 18 may independently control the light intensities of the irradiation points SP in each plane arranged in the optical axis direction for each plane.

For example, in the example illustrated in FIG. 8 to FIG. 10, the light intensities of the irradiation points SP in the IXa-IXa cross-section, the IXb-IXb cross-section, and the IXc-IXc cross-section may be independently set for each cross-section according to the material (or the processing speed) in each cross-section. Further, the irradiation time for each cross-section may also be set independently.

FIG. 23 is a flowchart illustrating a laser processing method according to the present embodiment. The laser processing method can be performed using the laser processing apparatus 10 described above. As illustrated in FIG. 23, first, as a control step S1, the hologram for modulating the phase of the light in each of the plurality of pixels arranged two-dimensionally is presented on the spatial light modulator 12. Next, as a light modulation step S2, the laser light La1 output from the laser light source 11 is input to the spatial light modulator 12, and the phase modulation of the laser light La1 is performed by the hologram. Further, as a focusing step S3, the laser light La2 after the phase modulation is focused using the focusing optical system 14.

In the previous control step S1, the spatial light modulator 12 presents the hologram for focusing the laser light La2 after the phase modulation on the plurality of irradiation points SP in the processing object W by the focusing step S3. Thus, the plurality of irradiation points SP are formed for the processing object W, and the processing (melting, crack generation, cutting, and the like) of the processing object W proceeds at each irradiation point SP. Further, as a photodetection step S4, the processing object W is irradiated with the observation light Lb having the wavelength different from the wavelength of the laser light La2, and the observation light (reflected light Lc) reflected from the processing object W is detected.

Thereafter, the steps S1 to S4 are repeatedly performed while changing the hologram. In the control step S1, as illustrated in FIG. 2, the plurality of holograms for changing the position of each irradiation point SP along the virtual line B which determines the processing region A are sequentially presented on the spatial light modulator 12. Further, when a difference between a set target value of the light intensity of the irradiation point SP and the detection result of the observation light is larger than a target error (step S5: NO), the hologram may be corrected (step S6).

As illustrated in FIG. 5 to FIG. 7, in the control step S1, the light intensities of the plurality of irradiation points SP are independently controlled for each irradiation point SP. Further, as illustrated in FIG. 8 to FIG. 17, in the control step S1, the shape of the processing region A defined by the plurality of irradiation points SP is set different for each of the plurality of planes intersecting the optical axis of the laser light La2. Further, in the control step S1, the light intensities of the plurality of irradiation points SP are independently controlled for each irradiation point SP, and further, the shape of the processing region A defined by the plurality of irradiation points SP is set different for the plurality of planes intersecting the optical axis of the laser light La2.

When the light intensity is independently controlled for each irradiation point SP, in the control step S1, the material change at each irradiation point SP is detected based on the detection result by the previous photodetection step S4, and the light intensity of each irradiation point SP is changed according to the material change.

Further, as illustrated in FIG. 24, a storage step S0 is performed before the control step S1, and in the storage step S0, data related to the light intensity of each irradiation point SP according to the material distribution in the processing object W is stored in advance in the storage unit (for example, the ROM 183 or the auxiliary storage device 186 illustrated in FIG. 4). Further, in the control step S1, the light intensity of each irradiation point SP is controlled based on the data. Further, when the difference between the set target value of the light intensity of the irradiation point SP and the detection result of the observation light is larger than the target error (step S5: NO), the hologram may be corrected (step S6).

Further, in the case where the shape of the processing region A is set different for each of the plurality of planes intersecting the optical axis of the laser light La2, as illustrated in FIG. 8 to FIG. 15, it is also possible to continuously change the shape of the processing region A in the optical axis direction of the laser light La2. In the case where the processing object W has a light transmitting property for the laser light La2, as illustrated in FIG. 8 to FIG. 15, it is also possible to set the area of the processing region A in a plane distant from the light irradiation surface W1 of the processing object W larger than the area of the processing region A in a plane close to the light irradiation surface W1.

It is also possible to determine the processing state at each irradiation point SP based on the detection result in the photodetection step S4, and control the presenting time of the hologram for each plane according to the processing state. It is also possible to independently control the light intensities of the plurality of irradiation points SP for each plane.

Further, when the hologram is changed in the control step S1, the spatial light modulator 12 presents the hologram with which the light intensity of the laser light La2 is less than the processing threshold value in any portion of the processing object W during a period from erasing a certain hologram to presenting another hologram.

Effects obtained by the laser processing apparatus 10 and the laser processing method according to the present embodiment described above will be described.

In the laser processing apparatus 10 and the laser processing method of the present embodiment, at least one of the shape and the size of the processing region A in each of at least two planes separated in the optical axis direction is set different for each plane. In this way, by changing the shape and/or the size of the processing region A for each of the plurality of planes separated in the optical axis direction, it is possible to perform the processing that is more complicated than in the past, such as freely setting the shape of the cross-section perpendicular to the optical axis direction.

Further, according to the present embodiment, adjustment of the light intensity for each irradiation point SP, on/off of each irradiation point SP, and movement of each irradiation point SP along the virtual line B can be realized without using any mechanical unit. Therefore, an apparatus configuration of the laser processing apparatus 10 can be greatly simplified, and the processing processes can be performed at high speed and with high accuracy.

As in the present embodiment, the processing object W may have the light transmitting property for the laser light La2 after the phase modulation, and the area of the processing region A in a plane distant from the light irradiation surface W1 of the processing object W may be larger than the area of the processing region A in a plane close to the surface. In this case, for example, it is possible to easily perform complicated processing such as formation of a hole having an inversely tapered shape in which a hole diameter increases as the distance from the light irradiation surface W1 of the processing object W increases.

As in the present embodiment, the control unit 18 (in the control step S1) may continuously change at least one of the shape and the size of the processing region A in the optical axis direction of the laser light La2. In this case, it is possible to easily perform processing of, for example, a hole in which a shape in a cross-section perpendicular to the optical axis direction is smoothly changed in the optical axis direction.

As in the present embodiment, the control unit 18 (in the control step S1) may sequentially present, on the spatial light modulator 12, the plurality of holograms for changing the position of each irradiation point SP along the virtual line B which determines the processing region A in each of the plurality of planes arranged in the optical axis direction. In this case, it is possible to reduce the output power required for the laser light source 11 compared to the case where the laser light La2 is applied at one time by a single hologram while providing sufficient light intensity to each irradiation point SP, and it is possible to contribute to downsizing of the laser light source 11.

As in the present embodiment, the laser processing apparatus 10 may include the observation light source 16 for irradiating the processing object W with the observation light Lb, and the photodetector 17 for detecting the reflected light Lc being the observation light reflected from the processing object W. Further, the laser processing method may further include the photodetection step S4 of irradiating the processing object W with the observation light Lb, and detecting the reflected light Lc from the processing object W.

Further, the control unit 18 (in the control step S1) may determine the processing state at each irradiation point SP based on the detection result by the photodetector 17 (photodetection step S4), and control the presenting time of the hologram for each plane according to the processing state. Further, the control unit 18 (in the control step S1) may detect the material change at each irradiation point SP based on the detection result by the photodetector 17, and change the light intensity of each irradiation point SP according to the material change. In these cases, processing accuracy can be further improved.

As in the present embodiment, the control unit 18 (in the control step S1) may control the light intensities of the at least two irradiation points SP included in the plurality of irradiation points SP independently of each other in each plane. In this case, when there is a difference in material according to a portion in the processing object W, that is, a difference in processing speed for the laser light La2 having the same intensity, the laser light La2 can be applied to each irradiation point SP corresponding to each portion with an appropriate light intensity. Therefore, it is possible to easily process the processing object W containing two or more types of materials into a complicated shape.

As in the present embodiment, the control unit 18 (in the control step S1) may control the light intensities of the irradiation points SP in at least two planes independently for each plane. In this case, when there is a difference in material constituting each plane, that is, a difference in processing speed for the laser light La2 having the same intensity, the laser light La2 can be applied with an appropriate light intensity according to the material of each plane.

As in the present embodiment, when the hologram is changed, the control unit 18 (in the control step S1) may present, on the spatial light modulator 12, the hologram with which the light intensity of the laser light La2 is less than the processing threshold value at any portion in the processing object W during a period from erasing one hologram to presenting another hologram. In this case, compared to the case where the laser light La2 is blocked by mechanical means such as a shutter, a mechanical shutter itself, a high-voltage device necessary for operating the mechanical shutter, and the like become unnecessary, and thus, it is possible to simplify the configuration of the laser processing apparatus 10 and contribute to reduction in size and cost of the laser processing apparatus 10.

As in the present embodiment, the laser processing apparatus 10 may include the storage unit for storing in advance the data related to the light intensity of each irradiation point SP according to the material distribution in the processing object W, and the control unit 18 may control the light intensity of each irradiation point SP based on the data. Further, the laser processing method may include, before the control step S1, the storage step S0 of storing in advance the data related to the light intensity of each irradiation point SP according to the material distribution in the processing object W, and in the control step S1, the light intensity of each irradiation point SP may be controlled based on the data. In these cases, the light intensity required for each irradiation point SP can be quickly obtained, and thus, a change time of the hologram can be reduced.

An example of a conventional laser processing method will be described. FIG. 25 is a diagram illustrating a laser processing method described in Patent Document 1. The laser processing method is a method of processing a workpiece (processing object) 110 having a processing surface 112 by laser ablation, and forms a three-dimensional geometric structure 114 in the workpiece 110.

Three different beam profiles 116, 118 and 120 are illustrated in FIG. 25. In each of the beam profiles 116, 118, and 120, the vertical axis indicates the light intensity, and the horizontal axis indicates the position. In each of the beam profiles 116, 118, and 120, a laser beam has a pattern with an irradiation region 122 and a non-irradiation region 124 at the processing surface 112. In the irradiation region 122, the light intensity is larger than the ablation threshold value. In the non-irradiation region 124, the light intensity is lower than the melting threshold value of the material of the workpiece 110.

The beam profiles 116, 118, and 120 are different from each other in the diameter, equivalent diameter, and/or geometric shape. That is, the beam profiles 116, 118, and 120 have diameters or equivalent diameters decreasing in this order. In addition, a partially-cutout cross-sectional view of the workpiece 110 illustrates that these beam profiles 116, 118, and 120 can have different geometric shapes. Thus, the workpiece 110 has a step-shaped geometric structure.

However, in the method described in Patent Document 1, the region irradiated with the laser light at one time is large, and thus, a laser light source having an extremely large output power is required in order to exceed the ablation threshold value over the entire region. Therefore, the size of the laser light source increases. Further, since the diameter of the beam profile basically decreases as the processing proceeds, there is a limitation on the shape that can be formed. In addition, when a plurality of materials having different processing speeds are mixed in the workpiece 110, it is difficult to set the light intensity and the irradiation time in accordance with the properties of the materials.

For the above problems, according to the laser processing apparatus 10 and the laser processing method of the present embodiment, the processing is performed by focusing the laser light La2 on the plurality of irradiation points SP, and thus, the output power of the laser light source 11 may be relatively small, and it is possible to contribute to downsizing of the laser light source 11. Further, it is also easy to process complicated shapes such as the hole Ha having an inversely tapered shape as illustrated in FIG. 8 and the hole Hh as illustrated in FIG. 16.

In addition, the light intensity and the irradiation time are independently controlled for each irradiation point SP, and thus, even when a plurality of materials are mixed in the processing region, the light intensity and the irradiation time can be easily set according to the property of each material. Further, optical components such as a $\pi/2$ plate and a polarization beam splitter for adjusting the light intensity become unnecessary, and the configuration of the laser processing apparatus can be further simplified.

FIG. 26 and FIG. 27 include diagrams illustrating a laser processing method described in Patent Document 2. In the laser processing method, a plurality of image reconstruction hologram data are prepared to perform laser processing. Specifically, as illustrated in (a) in FIG. 26, a processing surface 200 is divided into a plurality of cells 201, one irradiation point 202 corresponds to one cell 201, and it is freely selected whether or not to form the irradiation point 202 for each cell 201.

Position movement hologram data is superimposed on the image reconstruction hologram data. Further, by processing and forming discrete point images illustrated in (b) to (e) in FIG. 26 on the processing surface 200 while changing the position movement hologram data, a processing shape 203 of a complicated shape illustrated in FIG. 27 is obtained.

However, in the method described in Patent Document 2, since the light intensity of each irradiation point 202 is not individually controlled, when a plurality of materials having different processing speeds are mixed in the processing surface 200, it is difficult to set the light intensity and the irradiation time in accordance with the properties of the materials.

On the other hand, according to the laser processing apparatus 10 and the laser processing method of the present embodiment, the light intensity and the irradiation time are independently controlled for each irradiation point SP, and thus, even when a plurality of materials are mixed in the processing region, the light intensity and the irradiation time can be easily set according to the properties of the materials.

The laser processing apparatus and the laser processing method are not limited to the embodiments and configuration examples described above, and may be modified in various ways. For example, in the above embodiment, it is described that, when a plurality of materials are included in the processing region A, the light intensity is independently controlled for each irradiation point SP, and thus, it is possible to perform the processing with the light intensities according to the properties of the materials. Without being limited to the above example, for example, even in the case where the processing region A is formed of a single material, a removal rate (removal amount) of the processing object W can be independently controlled for each portion of the processing region A by independently controlling the light intensity for each irradiation point SP, and a more complicated shape can be realized.

Further, in the above embodiment, the case where the light intensity of each of the plurality of irradiation points SP is independently controlled has been exemplified, however, when it is not necessary to independently control all the irradiation points SP, the light intensities of at least two irradiation points SP out of the plurality of irradiation points SP may be independently controlled. Even in this case, the effects of the above embodiment can be achieved.

The laser processing apparatus of the above embodiment includes a spatial light modulator for inputting laser light output from a laser light source, presenting a hologram for modulating a phase of the laser light in each of a plurality of pixels arranged two-dimensionally, and outputting laser light after phase modulation by the hologram; a focusing optical system provided at a subsequent stage of the spatial light modulator; and a control unit for presenting, on the spatial light modulator, the hologram for focusing the laser light after the phase modulation output from the spatial light modulator on a plurality of irradiation points in a processing object by the focusing optical system, and the control unit sets at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis to be different from each other.

The laser processing method of the above embodiment repeatedly performs a control step of presenting, on a spatial light modulator, a hologram for modulating a phase of light in each of a plurality of pixels arranged two-dimensionally; a light modulation step of inputting laser light output from a laser light source to the spatial light modulator, and performing phase modulation of the laser light by the hologram; and a focusing step of focusing the laser light after the phase modulation, and in the control step, the spatial light modulator presents the hologram for focusing the laser light after the phase modulation on a plurality of irradiation points in a processing object by the focusing step, and at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis is set different from each other.

In the above laser processing apparatus, the processing object may have a light transmitting property for the laser light after the phase modulation, and an area of the processing region in one plane out of the first and second planes distant from a light irradiation surface of the processing object may be set larger than an area of the processing region in the other plane.

In the above laser processing method, the processing object may have a light transmitting property for the laser light after the phase modulation, and in the control step, an area of the processing region in one plane out of the first and second planes distant from a light irradiation surface of the processing object may be set larger than an area of the processing region in the other plane.

According to the above configuration, it is possible to easily perform complicated processing such as formation of a hole having an inversely tapered shape in which a hole diameter increases as a distance from the light irradiation surface of the processing object increases.

In the above laser processing apparatus, the control unit may continuously change at least one of the shape and the size of the processing region in the direction of the optical axis.

In the above laser processing method, in the control step, at least one of the shape and the size of the processing region may be continuously changed in the direction of the optical axis.

According to the above configuration, it is possible to easily perform processing of, for example, a hole in which a shape in a cross-section perpendicular to the optical axis direction is smoothly changed in the optical axis direction.

In the above laser processing apparatus, the control unit may sequentially present, on the spatial light modulator, a plurality of holograms for changing a position of each irradiation point along a virtual line which determines the processing region in each of the first and second planes.

In the above laser processing method, in the control step, the spatial light modulator may sequentially present a plurality of holograms for changing a position of each irradiation point along a virtual line which determines the processing region in each of the first and second planes.

According to the above configuration, it is possible to reduce an output power required for the laser light source compared to the case where the laser light is applied at one time by a single hologram while providing sufficient light intensity to each irradiation point, and to contribute to downsizing of the laser light source.

The above laser processing apparatus may further include an observation light source for irradiating the processing object with observation light; and a photodetector for detecting the observation light reflected from the processing object, and the control unit may determine a processing state at each irradiation point based on a detection result by the photodetector, and control a presenting time of the hologram for the first and second planes according to the processing state.

The above laser processing method may further include a photodetection step of irradiating the processing object with observation light, and detecting the observation light reflected from the processing object, and in the control step, a processing state at each irradiation point may be determined based on a detection result by the photodetection step, and a presenting time of the hologram for the first and second planes may be controlled according to the processing state.

According to the above configuration, processing accuracy can be further improved.

In the above laser processing apparatus, the control unit may control light intensities of at least two irradiation points included in the plurality of irradiation points independently of each other in each plane.

In the above laser processing method, in the control step, light intensities of at least two irradiation points included in the plurality of irradiation points may be controlled independently of each other in each plane.

According to the above configuration, when there is a difference in material depending on a portion of the processing object, that is, a difference in processing speed for the laser light having the same intensity, each irradiation point corresponding to each portion can be irradiated with the laser light with an appropriate light intensity. Therefore, it is possible to easily process the processing object including two or more types of materials into a complicated shape. Further, even in the case where the processing region is made of a single material, a removal rate (removal amount) of the processing object can be independently controlled for each portion of the processing region by independently controlling the light intensity for each irradiation point, and thus, a more complicated shape can be realized.

In the above laser processing apparatus, the control unit may control light intensities of the plurality of irradiation points in the first plane and light intensities of the plurality of irradiation points in the second plane independently of each other.

In the above laser processing method, in the control step, light intensities of the plurality of irradiation points in the first plane and light intensities of the plurality of irradiation points in the second plane may be controlled independently of each other.

According to the above configuration, when there is a difference in material constituting each of the first and second planes, that is, a difference in processing speed for the laser light having the same intensity, the laser light can be applied with an appropriate light intensity according to the material of each plane.

In the above laser processing apparatus, when the hologram is changed, the control unit may present, on the spatial light modulator, a hologram with which a light intensity of the laser light is less than a processing threshold value at any portion in the processing object during a period from erasing a certain hologram to presenting another hologram.

In the above laser processing method, in the control step, when the hologram is changed, the spatial light modulator may present a hologram with which a light intensity of the laser light is less than a processing threshold value at any portion in the processing object during a period from erasing a certain hologram to presenting another hologram.

According to the above configuration, it is possible to simplify the configuration of the laser processing apparatus compared to the case where the laser light is blocked by mechanical means such as a shutter.

INDUSTRIAL APPLICABILITY

The present invention can be used as a laser processing apparatus and a laser processing method capable of performing more complicated processing in a configuration in which focused irradiation is simultaneously performed on a plurality of irradiation points by phase-modulating laser light using a spatial light modulator.

REFERENCE SIGNS LIST

10—laser processing apparatus, 11—laser light source, 12—spatial light modulator, 13—dichroic mirror, 14—focusing optical system, 15—drive unit, 16—observation light source, 17—photodetector, 18—control unit, 110—workpiece, 112—processing surface, 114—geometric structure, 116, 118, 120—beam profile, 122—irradiation region, 124—non-irradiation region, 181—CPU, 182—RAM, 183—ROM, 184—input device, 185—digital/analog converter, 186—auxiliary storage device, 200—processing surface, 201—cell, 202—irradiation point, 203—processing shape, A—processing region, B—virtual line, Ha, Hb, Hc, Hd, He, Hh—hole, Hf, Hg—through hole, Hfa, Hfb, Hga, Hgb—hole, La1, La2—laser light, Lb—observation light, Lc—reflected light, Sa—signal, SP—irradiation point, Vd—drive voltage, W—processing object, W1—light irradiation surface, W2, W3, W4—surface, Wa, Wb, Wc, Wd, We—region.

The invention claimed is:

1. A laser processing apparatus comprising:
a spatial light modulator configured to input laser light output from a laser light source, present a hologram for modulating a phase of the laser light in each of a plurality of pixels arranged two-dimensionally, and output laser light after phase modulation by the hologram;
a focusing optical system provided at a subsequent stage of the spatial light modulator; and
a control unit configured to present, on the spatial light modulator, the hologram for simultaneously focusing the laser light after the phase modulation output from the spatial light modulator on a plurality of irradiation points in a processing object by the focusing optical system, wherein
the control unit is configured to set at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis to be different from each other, and wherein
the control unit is configured to simultaneously control light intensities of the plurality of irradiation points in the first plane and light intensities of the plurality of irradiation points in the second plane independently of each other.

2. The laser processing apparatus according to claim 1, wherein the processing object has a light transmitting property for the laser light after the phase modulation, and an area of the processing region in one plane out of the first and second planes distant from a light irradiation surface of the processing object is set larger than an area of the processing region in the other plane.

3. The laser processing apparatus according to claim 1, wherein the control unit is configured to continuously change at least one of the shape and the size of the processing region in the direction of the optical axis.

4. The laser processing apparatus according to claim 1, wherein the control unit is configured to sequentially present, on the spatial light modulator, a plurality of holograms for changing a position of each irradiation point along a virtual line which determines the processing region in each of the first and second planes.

5. The laser processing apparatus according to claim 1, further comprising:
an observation light source configured to irradiate the processing object with observation light; and
a photodetector configured to detect the observation light reflected from the processing object, wherein
the control unit is configured to determine a processing state at each irradiation point based on a detection result by the photodetector, and control a presenting time of the hologram for the first and second planes according to the processing state.

6. The laser processing apparatus according to claim 1, wherein the control unit is configured to control light intensities of at least two irradiation points included in the plurality of irradiation points independently of each other in each plane.

7. The laser processing apparatus according to claim 1, wherein when the hologram is changed, the control unit is configured to present, on the spatial light modulator, a hologram with which a light intensity of the laser light is less than a processing threshold value at any portion in the processing object during a period from erasing a certain hologram to presenting another hologram.

8. A laser processing method repeatedly performing:
performing a control of presenting, on a spatial light modulator, a hologram for modulating a phase of light in each of a plurality of pixels arranged two-dimensionally;
performing a light modulation of inputting laser light output from a laser light source to the spatial light modulator, and performing phase modulation of the laser light by the hologram; and
performing a focusing of focusing the laser light after the phase modulation, wherein
in the control, the spatial light modulator presents the hologram for simultaneously focusing the laser light after the phase modulation on a plurality of irradiation points in a processing object by the focusing, and
at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis is set different from each other, and wherein
in the control, light intensities of the plurality of irradiation points in the first plane and light intensities of the plurality of irradiation points in the second plane are simultaneously controlled independently of each other.

9. The laser processing method according to claim 8, wherein the processing object has a light transmitting property for the laser light after the phase modulation, and in the control, an area of the processing region in one plane out of the first and second planes distant from a light irradiation surface of the processing object is set larger than an area of the processing region in the other plane.

10. The laser processing method according to claim 8, wherein in the control, at least one of the shape and the size of the processing region is continuously changed in the direction of the optical axis.

11. The laser processing method according to claim 8, wherein in the control, the spatial light modulator sequentially presents a plurality of holograms for changing a position of each irradiation point along a virtual line which determines the processing region in each of the first and second planes.

12. The laser processing method according to claim 8, further comprising performing a photodetection of irradiating the processing object with observation light, and detecting the observation light reflected from the processing object, wherein in the control, a processing state at each irradiation point is determined based on a detection result by the photodetection, and a presenting time of the hologram for the first and second planes is controlled according to the processing state.

13. The laser processing method according to claim 8, wherein in the control, light intensities of at least two irradiation points included in the plurality of irradiation points are controlled independently of each other in each plane.

14. The laser processing method according to claim 8, wherein in the control, when the hologram is changed, the spatial light modulator presents a hologram with which a light intensity of the laser light is less than a processing threshold value at any portion in the processing object during a period from erasing a certain hologram to presenting another hologram.

15. A laser processing apparatus comprising:

a spatial light modulator configured to input laser light output from a laser light source, present a hologram for modulating a phase of the laser light in each of a plurality of pixels arranged two-dimensionally, and output laser light after phase modulation by the hologram;

a focusing optical system provided at a subsequent stage of the spatial light modulator; and a control unit configured to present, on the spatial light modulator, the hologram for focusing the laser light after the phase modulation output from the spatial light modulator on a plurality of irradiation points in a processing object by the focusing optical system, wherein the control unit is configured to set at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis to be different from each other, and wherein the laser processing apparatus further comprises:

an observation light source configured to irradiate the processing object with observation light; and a photodetector configured to detect the observation light reflected from the processing object, wherein the control unit is configured to determine a processing state at each irradiation point based on a detection result by the photodetector, and control a presenting time of the hologram for the first and second planes according to the processing state.

16. A laser processing apparatus comprising:

a spatial light modulator configured to input laser light output from a laser light source, present a hologram for modulating a phase of the laser light in each of a plurality of pixels arranged two-dimensionally, and output laser light after phase modulation by the hologram;

a focusing optical system provided at a subsequent stage of the spatial light modulator; and a control unit configured to present, on the spatial light modulator, the hologram for focusing the laser light after the phase modulation output from the spatial light modulator on a plurality of irradiation points in a processing object by the focusing optical system, wherein the control unit is configured to set at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis to be different from each other, and wherein when the hologram is changed, the control unit is configured to present, on the spatial light modulator, a hologram with which a light intensity of the laser light is less than a processing threshold value at any portion in the processing object during a period from erasing a certain hologram to presenting another hologram.

17. A laser processing method repeatedly performing:

performing a control of presenting, on a spatial light modulator, a hologram for modulating a phase of light in each of a plurality of pixels arranged two-dimensionally;

performing a light modulation of inputting laser light output from a laser light source to the spatial light modulator, and performing phase modulation of the laser light by the hologram; and performing a focusing of focusing the laser light after the phase modulation, wherein in the control, the spatial light modulator presents the hologram for focusing the laser light after the phase modulation on a plurality of irradiation points in a processing object by the focusing, and at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis is set different from each other, and wherein the laser processing method further comprises:

performing a photodetection of irradiating the processing object with observation light, and detecting the observation light reflected from the processing object, wherein in the control, a processing state at each irradiation point is determined based on a detection result by the photodetection, and a presenting time of the hologram for the first and second planes is controlled according to the processing state.

18. A laser processing method repeatedly performing:

performing a control of presenting, on a spatial light modulator, a hologram for modulating a phase of light in each of a plurality of pixels arranged two-dimensionally;

performing a light modulation of inputting laser light output from a laser light source to the spatial light modulator, and performing phase modulation of the laser light by the hologram; and performing a focusing of focusing the laser light after the phase modulation, wherein in the control, the spatial light modulator presents the hologram for focusing the laser light after the phase modulation on a plurality of irradiation points in a processing object by the focusing, and at least one of a shape and a size of a processing region defined by the plurality of irradiation points in a first plane intersecting an optical axis of the laser light after the phase modulation with which the processing object is irradiated and a processing region defined by the plurality of irradiation points in a second plane intersecting the optical axis and separated from the first plane in a direction of the optical axis is set different from each other, and wherein in the control, when the hologram is changed, the spatial light modulator presents a hologram with which a light intensity of the laser light is less than a processing threshold value at any portion in the processing object during a period from erasing a certain hologram to presenting another hologram.

* * * * *